(12) United States Patent
Thomas

(10) Patent No.: US 11,475,104 B2
(45) Date of Patent: *Oct. 18, 2022

(54) VERIFICATION SYSTEM FOR SECURE TRANSMISSION IN A DISTRIBUTED PROCESSING NETWORK

(71) Applicant: ZACT INC., Saratoga, CA (US)

(72) Inventor: John K. Thomas, Saratoga, CA (US)

(73) Assignee: ZACT INC., Saratoga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/506,800

(22) Filed: Jul. 9, 2019

(65) Prior Publication Data
US 2019/0332746 A1 Oct. 31, 2019

Related U.S. Application Data

(63) Continuation of application No. 16/186,277, filed on Nov. 9, 2018, now Pat. No. 10,366,212, which is a
(Continued)

(51) Int. Cl.
G06F 21/10 (2013.01)
G06F 21/31 (2013.01)
H04L 9/40 (2022.01)

(52) U.S. Cl.
CPC .............. *G06F 21/10* (2013.01); *G06F 21/31* (2013.01); *H04L 63/08* (2013.01);
(Continued)

(58) Field of Classification Search
CPC .. G06F 21/10; G06F 21/31; G06F 2221/0704; G06F 2221/0713; H04L 63/08; H04L 63/0876; H04L 2463/082
(Continued)

(56) References Cited

U.S. PATENT DOCUMENTS 6,085,242 A 7/2000 Chandra
7,387,250 B2 6/2008 Muni
(Continued)

FOREIGN PATENT DOCUMENTS

EP 1513120 3/2005
JP 2008217277 9/2008

OTHER PUBLICATIONS

U.S. Appl. No. 16/071,280, filed Jul. 19, 2018, Georgiadis et al.
(Continued)

Primary Examiner — Dereena T Cattungal
(74) Attorney, Agent, or Firm — Sheridan Ross PC

(57) ABSTRACT

A verification system, includes: an arithmetic/logic unit ("ALU") to perform one or more mathematical operations and compare selected variables; a register to hold a value from a comparison of selected variables performed by the ALU; an instruction decoder to provide read and write commands to memory; an address bus to provide an address to memory for a read or write operation; and a data bus to provide or access data for a write or read operation to or from memory, wherein the ALU generates and provides a recipient identifier to a target computational device, the recipient identifier being related to an identity of the target computational device and/or a target device human operator, and write the recipient identifier to memory in response to a write command issued by the instruction decoder and, as a part of a transaction, the ALU receives, from a user computational device of a first user, the recipient identifier and a credential of the first user and/or user computational device, compares each of the recipient identifier and credential against one or more stored values, and, when each of the comparisons match, causes information provider system to provide restricted information to the target computational
(Continued)

device to enable the target computational device to perform an operation.

18 Claims, 19 Drawing Sheets

Related U.S. Application Data continuation of application No. 14/833,868, filed on Aug. 24, 2015, now Pat. No. 10,157,269.

(60) Provisional application No. 62/040,711, filed on Aug. 22, 2014.

(52) U.S. Cl.
CPC .. *H04L 63/0876* (2013.01); *G06F 2221/0704* (2013.01); *G06F 2221/0713* (2013.01); *H04L 2463/082* (2013.01)

(58) Field of Classification Search
USPC .......................................................... 726/7
See application file for complete search history.

(56) References Cited

U.S. PATENT DOCUMENTS

| | | | |
|---|---|---|---|
| 7,827,101 B2 | 11/2010 | Mascavage, III | |
| 7,861,077 B1* | 12/2010 | Gallagher, III | H04L 63/08 713/155 |
| 8,090,615 B1 | 1/2012 | Cunningham et al. | |
| 8,799,646 B1* | 8/2014 | Pei | H04L 63/08 713/155 |
| 9,288,213 B2* | 3/2016 | Seo | H04L 63/104 |
| 9,792,611 B2* | 10/2017 | Hammad | G06Q 20/385 |
| 9,805,369 B2 | 10/2017 | Thomas | |
| 10,157,269 B2 | 12/2018 | Thomas | |
| 10,318,747 B1 | 6/2019 | MacCarthaigh et al. | |
| 10,366,212 B2 | 7/2019 | Thomas | |
| 10,586,229 B2 | 3/2020 | Hurry et al. | |
| 10,595,100 B2* | 3/2020 | Lee | H04N 21/4782 |
| 10,826,703 B1 | 11/2020 | Shipley | |
| 2004/0143733 A1 | 7/2004 | Ophir et al. | |
| 2005/0027543 A1* | 2/2005 | Labrou | G06Q 20/12 705/26.35 |
| 2005/0235148 A1 | 10/2005 | Scheidt et al. | |
| 2006/0215837 A1 | 9/2006 | Chen et al. | |
| 2006/0242019 A1 | 10/2006 | Walker et al. | |
| 2006/0242020 A1 | 10/2006 | Walker et al. | |
| 2007/0198436 A1* | 8/2007 | Weiss | H04L 9/0891 705/75 |
| 2007/0198438 A1 | 8/2007 | Bentley et al. | |
| 2007/0208953 A1* | 9/2007 | Durand | H04L 63/0428 713/193 |
| 2007/0271194 A1 | 11/2007 | Walker et al. | |
| 2008/0091920 A1 | 4/2008 | Shaw et al. | |
| 2008/0095361 A1 | 4/2008 | Wifvesson et al. | |
| 2008/0222048 A1 | 9/2008 | Higgins et al. | |
| 2008/0228578 A1 | 9/2008 | Mashinsky | |
| 2008/0228642 A1 | 9/2008 | Kim et al. | |
| 2008/0243702 A1* | 10/2008 | Hart | G06Q 20/3672 705/66 |
| 2008/0319913 A1* | 12/2008 | Wiechers | G06Q 20/385 705/67 |
| 2009/0031141 A1 | 1/2009 | Pearson et al. | |
| 2009/0084840 A1 | 4/2009 | Williams et al. | |
| 2009/0099961 A1 | 4/2009 | Ogilvy | |
| 2009/0283589 A1 | 11/2009 | Moore et al. | |
| 2009/0288012 A1 | 11/2009 | Hertel et al. | |
| 2010/0205448 A1* | 8/2010 | Tarhan | G06F 21/33 713/185 |
| 2010/0250290 A1 | 9/2010 | Lefkowitz et al. | |
| 2010/0251352 A1 | 9/2010 | Zarchy et al. | |
| 2011/0083177 A1 | 4/2011 | Eddahabi et al. | |
| 2011/0137742 A1 | 6/2011 | Parikh | |
| 2011/0138185 A1* | 6/2011 | Ju | H04L 9/3271 713/171 |
| 2011/0276479 A1* | 11/2011 | Thomas | G06Q 20/12 705/40 |
| 2011/0289003 A1 | 11/2011 | Womack et al. | |
| 2011/0307703 A1 | 12/2011 | Ogg et al. | |
| 2012/0079606 A1 | 3/2012 | Evans et al. | |
| 2012/0109728 A1 | 5/2012 | Sparks | |
| 2012/0150742 A1* | 6/2012 | Poon | H04L 63/0869 705/44 |
| 2012/0191615 A1* | 7/2012 | Schibuk | H04L 9/3228 705/76 |
| 2012/0240195 A1* | 9/2012 | Weiss | H04L 63/0846 726/4 |
| 2012/0265684 A1* | 10/2012 | Singh | G06Q 20/10 705/44 |
| 2012/0296978 A1 | 11/2012 | Inoue et al. | |
| 2012/0304273 A1* | 11/2012 | Bailey | G06Q 20/3823 726/9 |
| 2013/0191289 A1* | 7/2013 | Cronic | G06Q 20/4014 705/67 |
| 2014/0172724 A1 | 6/2014 | Dua | |
| 2014/0196134 A1* | 7/2014 | Yamaguchi | G06F 21/44 726/7 |
| 2014/0223578 A1 | 8/2014 | Ross | |
| 2015/0089244 A1 | 3/2015 | Roth et al. | |
| 2015/0095235 A1 | 4/2015 | Dua | |
| 2015/0213435 A1* | 7/2015 | Douglas | G06Q 20/322 705/64 |
| 2015/0269566 A1* | 9/2015 | Gaddam | G06Q 20/385 705/67 |
| 2015/0269570 A1 | 9/2015 | Phan et al. | |
| 2015/0278487 A1* | 10/2015 | Scott | H04L 9/3239 726/28 |
| 2015/0332225 A1 | 11/2015 | Schulz | |
| 2015/0356524 A1* | 12/2015 | Pennanen | G06Q 20/4012 705/71 |
| 2015/0379510 A1 | 12/2015 | Smith | |
| 2016/0085955 A1 | 3/2016 | Lerner | |
| 2016/0098723 A1 | 4/2016 | Feeney | |
| 2016/0127895 A1* | 5/2016 | Bangole | H04L 65/4084 380/279 |
| 2016/0150042 A1* | 5/2016 | Pattison | H04W 4/21 709/203 |
| 2016/0358184 A1 | 12/2016 | Radocchia et al. | |
| 2017/0111175 A1 | 4/2017 | Oberhauser et al. | |
| 2017/0161734 A1 | 6/2017 | Bankston et al. | |
| 2018/0137512 A1 | 5/2018 | Georgiadis et al. | |
| 2018/0144114 A1 | 5/2018 | Fiske | |
| 2018/0183778 A1 | 6/2018 | Bettenburg et al. | |
| 2018/0240107 A1 | 8/2018 | Andrade | |
| 2018/0329693 A1* | 11/2018 | Eksten | G06F 16/21 |
| 2019/0179801 A1 | 6/2019 | Jang et al. | |
| 2019/0228178 A1 | 7/2019 | Sharma et al. | |
| 2019/0349371 A1 | 11/2019 | Smith et al. | |
| 2020/0007316 A1 | 1/2020 | Krishnamacharya et al. | |
| 2020/0076603 A1 | 3/2020 | Li | |
| 2020/0311299 A1 | 10/2020 | Amar | |
| 2020/0313897 A1 | 10/2020 | Heath et al. | |
| 2020/0349566 A1 | 11/2020 | Mei | |

OTHER PUBLICATIONS

"QR codes set to revolutionize shopping," Anonymous. Anonymous, The Province. Vancouver, B.C., 2008, p. A.46., Printed via Proquest, 2 pages.
"Companies providing QR codes for camera-equipped phones," Pacific Research, Consulting, 2004, , Printed via Proquest, 2 pages.
"Analysis: QR codes get backing from major publishers," New Media Age, 2007, 10., Printed via Proquest, 1 page.
Extended European Search Report for European Patent Application No. 15859456.4, dated Mar. 20, 2018, 7 pages.
International Search Report and Written Opinion for International (PCT) Patent Application No. PCT/US15/46565, dated Jun. 24, 2016, 12 pages.

(56) References Cited

OTHER PUBLICATIONS

International Preliminary Report on Patentability for International (PCT) Patent Application No. PCT/US15/46565, dated Mar. 9, 2017, 8 pages.
International Search Report and Written Opinion for International (PCT) Patent Application No. PCT/US17/14162, dated Apr. 21, 2017 9 pages.
International Preliminary Report on Patentability for International (PCT) Patent Application No. PCT/US17/14162, dated Aug. 2, 2018 8 pages.
Extended European Search Report for European Patent Application No. 17741939.7, dated Aug. 1, 2019, 7 pages.
Intent to Grant European Patent Application No. 17741939.7, dated Jun. 24, 2020, 7 pages.
Extended European Search Report for European Patent Application No. 15859456.4, dated Dec. 6, 2019, 5 pages.

\* cited by examiner

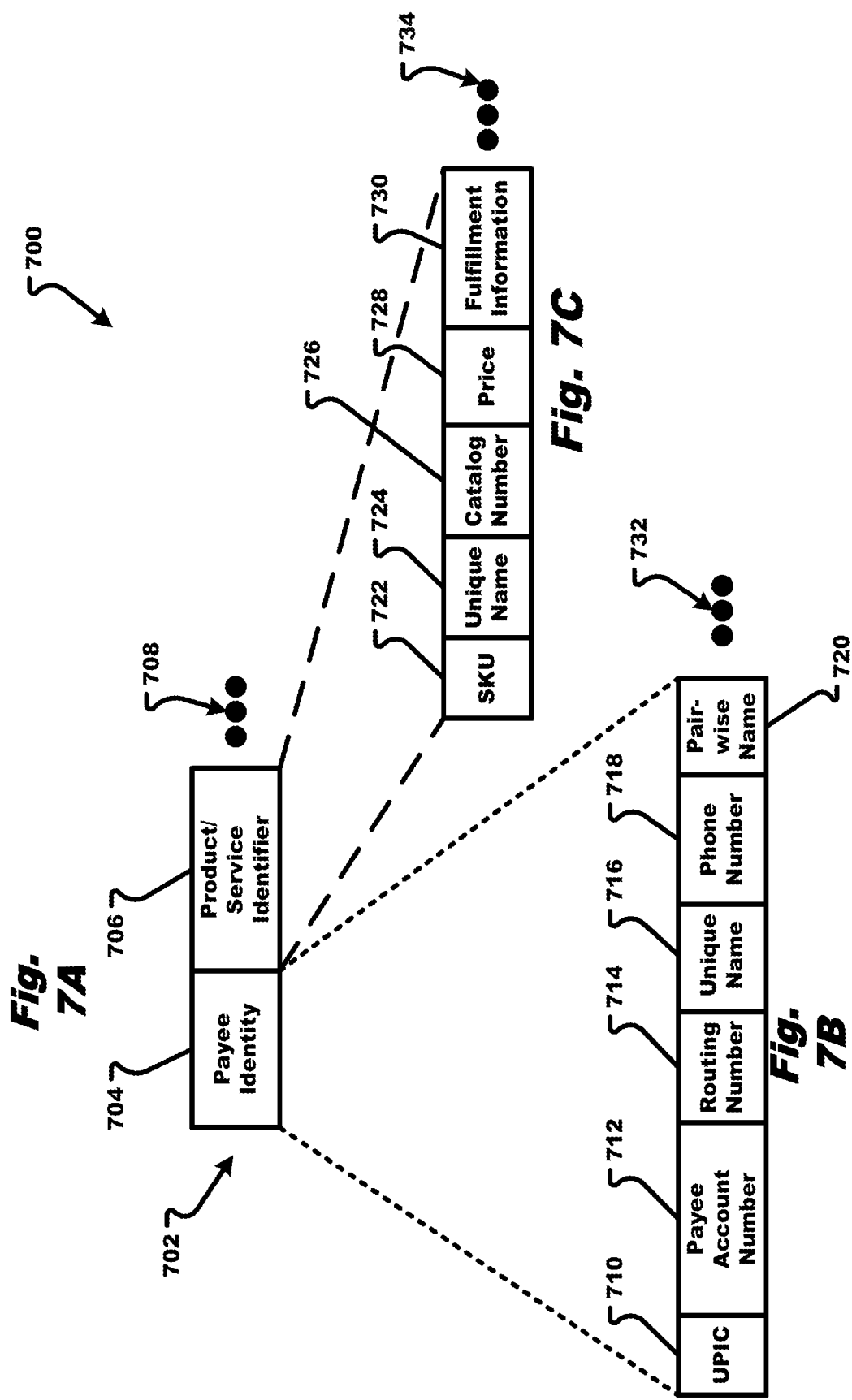

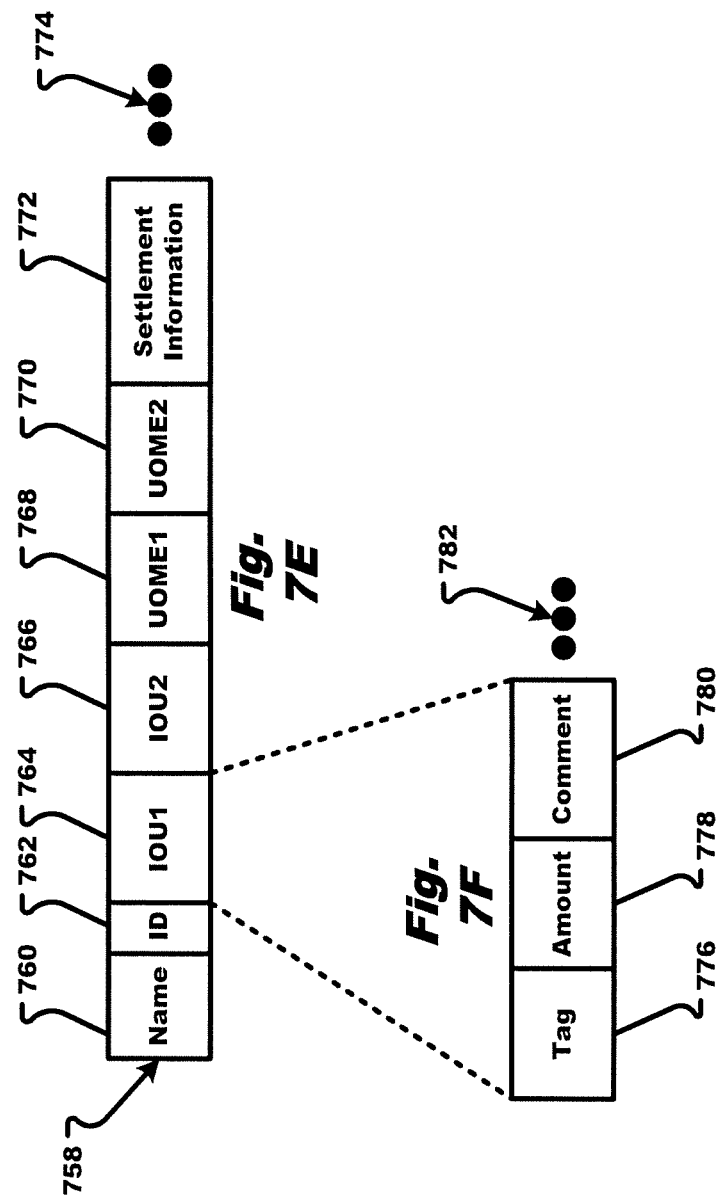

VERIFICATION SYSTEM FOR SECURE TRANSMISSION IN A DISTRIBUTED PROCESSING NETWORK

CROSS-REFERENCE TO RELATED APPLICATIONS

This application is a continuation of U.S. patent application Ser. No. 16/186,277, filed Nov. 9, 2018, which is a continuation of U.S. patent application Ser. No. 14/833,868, filed Aug. 24, 2015, now U.S. Pat. No. 10,157,269, which claims priority to U.S. Provisional Patent Application 62/040,711, filed Aug. 22, 2014, each of which is incorporated herein by reference in its entirety for all that it teaches and for all purposes.

BACKGROUND

Electronic exchange of proprietary or confidential information between unrelated third parties can be problematic. While security protocols, such as cryptographic or encryption protocols, can reduce unintended disclosure to unauthorized or unverified third parties, they are not fool proof or universally applicable to all situations. The information can be exchanged with an unintended recipient improperly using credentials of an intended recipient.

Internet-based software and digital media copy piracy is a problem that costs global software and media providers billions each year. Providers impose forms of digital media copy protection, such as controversial digital rights management (DRM) technology, which limit the amount of control payer users have over the use of products and content they have purchased. Some copyright owners voluntarily reduce the scope of what is considered infringement by employing relatively permissive, "open" licensing strategies: rather than privately negotiating license terms with individual users who must first seek out the copyright owner and ask for permission, the copyright owner publishes and distributes the work with a prepared license that anyone can use, as long as they adhere to certain conditions. This has the effect of reducing infringement by simply permitting certain types of uses under terms that the copyright owner considers reasonable. Examples include free software licenses, like the GNU General Public License (GPL), and the Creative Commons licenses, which are predominantly applied to visual and literary works.

While these methodologies can reduce incidents of infringement, they can be improved, particularly where user-based, as opposed to device-based, licenses are granted. Unlike a device-based license, a user-based license permits the user to use any device to execute licensed software or access licensed digital media. User-based licenses stem from users desiring more flexibility in how, when, and on which of multiple user devices they execute licensed software or access digital media, putting increasing demands on software and content providers.

SUMMARY

It is with respect to the above issues and other problems that the embodiments presented herein were contemplated. A verification system is provided that, through authentication over a distributed processing network such as the Internet, can provide secure user access to licensed digital media, software, and other restricted information.

A verification system can include: an arithmetic/logic unit ("ALU") to perform one or more mathematical operations and compare selected variables; a register to hold a value from a comparison of selected variables performed by the ALU; an instruction decoder to provide read and write commands to memory; an address bus to provide an address to memory for a read or write operation; and a data bus to provide or access data for a write or read operation to or from memory.

The ALU can generate and provide a recipient identifier to a target computational device, the recipient identifier being related to an identity of the target computational device and/or a target device human operator, and write the recipient identifier to memory in response to a write command issued by the instruction decoder.

As a part of a transaction, the ALU can receive, from a user computational device of a first user, the recipient identifier and a credential of the first user and/or user computational device, compare each of the recipient identifier and credential against one or more stored values, and, when each of the comparisons match, cause information provider system to provide restricted information to the target computational device to enable the target computational device to perform an operation.

A Method can Include the Steps:

providing an arithmetic/logic unit ("ALU") to perform one or more mathematical operations and compare selected variables, a register to hold a value from a comparison of selected variables performed by the ALU, an instruction decoder to provide read and write commands to memory, an address bus to provide an address to memory for a read or write operation, and a data bus to provide or access data for a write or read operation to or from memory;

generating and providing, by the ALU, a recipient identifier to a target computational device, the recipient identifier being related to an identity of the target computational device and/or a target device human operator, and write the recipient identifier to memory in response to a write command issued by the instruction decoder;

as a part of a transaction, receiving, by the ALU, from a user computational device of a first user, the recipient identifier and a credential of the first user and/or user computational device;

comparing, by the ALU, each of the recipient identifier and credential against one or more stored values; and when each of the comparisons match, causing, by the ALU, the information provider system to provide restricted information to the target computational device to enable the target computational device to perform an operation.

A network security system can include: a first computational device associated with a first user; a second computational device; an information provider system comprising, in computer readable memory, restricted first information associated with the first user; and a verification system comprising a microprocessor and computer readable medium.

The first computational device, second computational device, information provider, and verification system can be in communication via a distributed processing network.

To provide the restricted first information to the second computational device, the first computational device receives a first electronic identifier provided to the second computational device by the verification system, the first computational device provides the first electronic identifier to the verification system, the verification system authenticates the first electronic identifier against a stored value in the computer readable medium of the verification system, and the verification system applies the following rules: (i) when the first electronic identifier is authenticated successfully, the verification system accesses the restricted first information from the information provider system and provides the restricted first information to the second computational device and (ii) when the first electronic identifier is not authenticated successfully, the verification system denies the second computational device access to the restricted first information.

The first user of the user computational device can be associated with a user-based license to access software and/or media. The information provider system can be operated by a provider of the software and/or media. The restricted information can be permission to access the software and/or media from the target computational device.

The first user of the user computational device can be associated with a first user credential. The restricted first information can be the first user credential.

The first user credential can be one or more of a password, username, personal identification number, security key, a digital signature, cryptographic secret, a cryptosystem identifier, and private or public key for a cryptographic protocol.

The recipient identifier can be one or more of an identifier of the target computational device, an electronic address of the target computational device, a session identifier of a session between at least two of the user computational device, target computational device, verification system, and information provider system, and generated from the identifier of the target computational device, electronic address of the target computational device, and the session identifier.

The verification system can authenticate one or more of the first user computational device and first user as a prerequisite to providing the restricted first information to the target computational device.

The ALU can generate and/or provide to the information provider system a request for restricted information, an indication of successfully authentication, and a surrogate identifier identifying the first user, the surrogate identifier being unrelated to the restricted information.

The ALU can write details of the transaction to memory in response to a write command issued by the instruction decoder. The ALU can receive details of the transaction from one or more of the user computational device, target computational device and information provider system. The ALU can read the written transaction details from memory in response to a read command issued by the instruction decoder. The ALU can compare the received details of the transaction against the written transaction details. When a carry bit of a test register indicates that the compared received transaction details do not match the written transaction detail, the ALU can generate an indication of a possible improper transaction.

The various embodiments discussed in the disclosure can provide advantages. For example, it can enable secure, low-risk, and low-cost transaction mechanisms to exchange restricted information between first and second persons or devices. Certain types of restricted information are maintained at the information provider and not provided to the verification system or another party. The information provider can simply verify the restricted information against a desired transaction, such as licensing the use of digital media or software, and send confirmation that the desired transaction complies with rules, policies, or other requirements.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible or non-transitory storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

A "credit card issuer" as used herein refers to a bank, credit union, or business that offers or issues a credit card. The credit card issuer makes the credit limit available to cardholders and is responsible for sending payments to merchants for purchases made with credit cards from that bank. Credit card issuers often need the help of payment processing networks, like Visa and MasterCard.

The term "credit card" or "charge card" as used herein refers to a card issued by a credit card issuer giving the holder an option to borrow funds, usually at point of sale. Credit cards can take many forms. They can be a plastic card having a readable strip, particularly a magnetic strip. They can be a smart card. They can be an electronic virtual card, which is stored on a computational device such as a personal digital assistant, cell phone, notebook computer, tablet computer, and the like. In such devices, the credit card information can be transmitted wirelessly, such as by scanning or wireless transmission, to a vendor's computational device to effect a transaction. Credit cards charge interest and are primarily used for short-term financing. Interest usually begins one month after a purchase is made and borrowing limits are pre-set according to the individual's credit rating.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The term "debit card" as used herein refers to an electronic card issued by a bank, which allows bank clients access to their account to withdraw cash or pay for goods and services.

The terms "determine", "calculate", and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "in communication with" as used herein refers to any coupling, connection, or interaction using electrical signals to exchange information or data, using any system, hardware, software, protocol, or format.

The term "network" as used herein refers to a system used by one or more user devices to communicate. The network can consist of one or more session managers, feature servers, communication endpoints, etc. that allow communications, whether voice or data, between two user devices. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "merchant" as used herein refers to a person, company, or other entity involved in wholesale or retail trade or distribution of goods and/or services.

The term "module" as used herein refers to any known or later developed hardware, software, firmware, artificial intelligence, fuzzy logic, or combination of hardware and software that is capable of performing the functionality associated with that element.

The term "smart card" as used herein refers to a card, typically plastic, embedded with a computer readable medium, such as a memory chip, and, optionally, a microprocessor and/or power source. The computer readable medium can be loaded with data, used for telephone calling, electronic cash payments, and other applications, and then periodically refreshed for additional use. A smart card can contain more information than a magnetic stripe card and can be programmed for different applications. Some cards can contain programming and data to support multiple applications and some can be updated to add new applications after they are issued. Smart cards can be designed to be inserted into a slot and read by a special reader or to be read at a distance, such as at a toll booth. Cards can be disposable or reloadable.

Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures:

FIGS. 7A through 7C are block diagrams of embodiments of data structures according to this disclosure;

FIGS. 7E and 7F are block diagrams of embodiments of data structures according to this disclosure;

Figure 1:
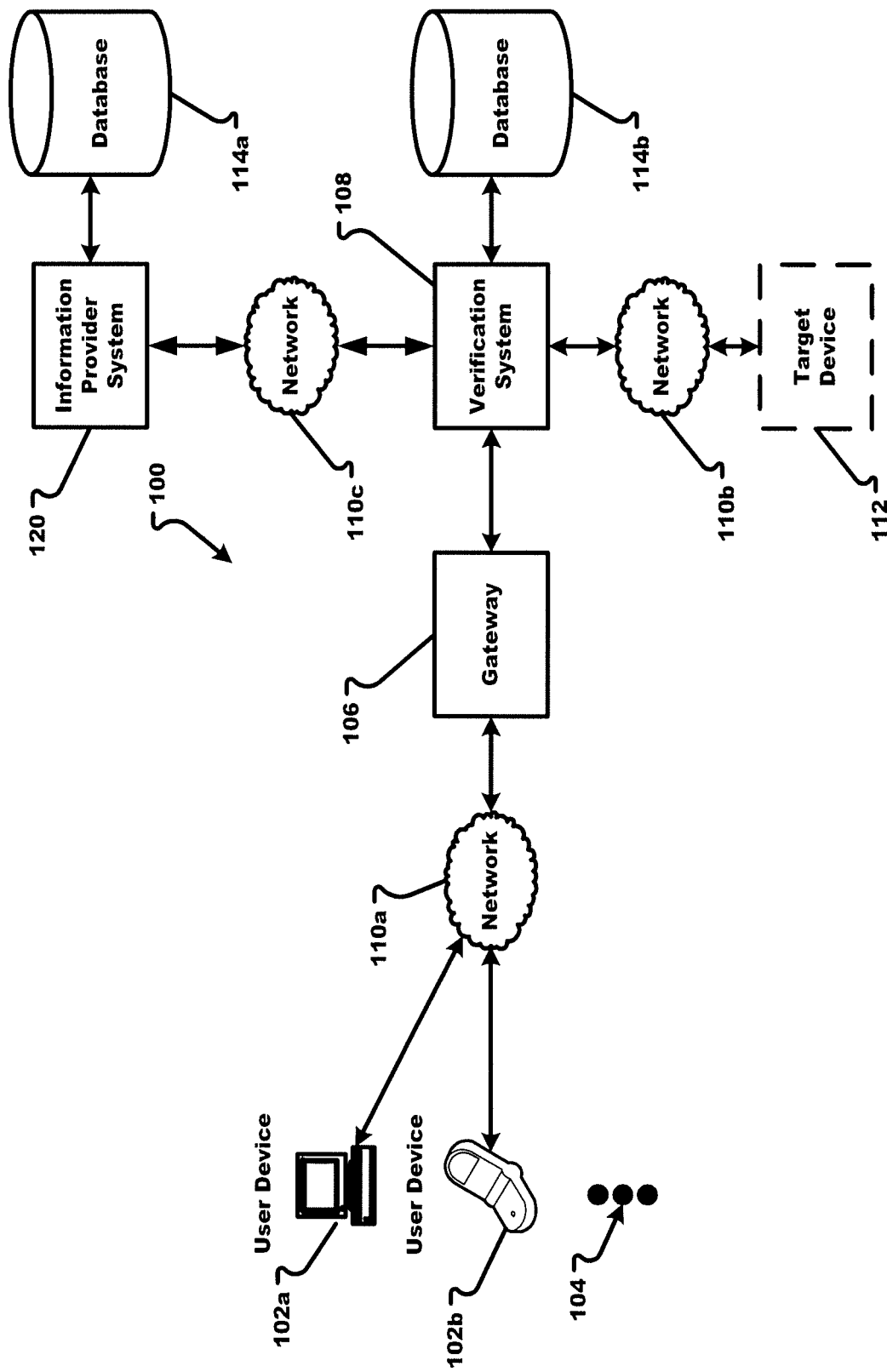
FIG. 1 is a block diagram of an embodiment of a system according to this disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The verification system can uniquely combine public credentials (known to everybody) with distributed, encrypted systems, out of band communications and multi-factor authentication to facilitate the transfer of value and valuable restricted information in a more secure manner that is difficult to compromise.

Prior to discussing the components and detailed operations of the verification system, a simplified illustration of the system is provided.

The verification system can be a Credential Authority (CA) that issues credentials or tokens (e.g., the recipient identifier) but, unlike current systems where the token or credential is issued to the user, the verification system issues the credential or token to a target device or third-party interacting with the target device.

The user device and/or verification system can act as a Credential Reviewing Authority (CRA). The CRA has the function of the receiving the credential from the user. The user has received the credential from the target device, which in turn received the credential from the CA. In addition to the credential, the CRA also received additional information from the user. Such additional information might include a username, password, personal identification information (mother's maiden name) or other information broadly described, as something the user knows. The additional information might also include information about the user device (that is used to transmit the credential to the CRA) and such information might include a user device identifier (for example, the CPU ID, the IMEI number of a mobile device, the SIM ID, a network ID such as those provided by operators of mobile networks), an application identifier like a serial number, or a synchronized counter (such as the RSA token and its variants) or other such information that is broadly classified as something the user has. Furthermore, the additional information provided with the credential may have to do with something the user is. Examples of such information include unique traits associated with the user such as fingerprints, facial attributes, voiceprints, retina scans or any other biological or physiological feature that is uniquely attributable to the user. Another aspect of something the user is has to do with the location of the user and the continuity of location. A user being located at a known location, a predicted location or at a projected location all contribute to the authenticity of the user. On the other hand, an unknown or unexpected location might indicate potential for concern regarding authenticity and this concern can prompt a fraud mitigation subsystem to require further authentication.

Depending on the application, the verification system and/or information provider system can act as an authentication system (AS) that provides an organization with the user's information to validate the authenticity of the user. For example, the organization might be the user's employer, the user's health-care provider, financial institution, University or College or any other organization that the user is a member of or associated with. The CA, CRA and AS act collectively as a Secure Service Provider (SSP).

When the verification system acts as the AS, a counterpart to the AS can reside at the user's organization (which can be the information provider and information provider system) and can be referred to as the Counter Authentication System (CAS), and this system either remains in the control of the user's organization or could be external to the user's organization or it could be part of the SSP. Unlike current authentication systems, the AS never gets or retains a user's uniquely identifiable restricted information such as name, date of birth, government issued identifiers like social security numbers, driver's license numbers, passport numbers, address and other such identifiers. All such restricted information regarding the user unique identity is only at the user's organization (or information provider). Even the CAS may not see such restricted information and may have a surrogate identifier for the user. The surrogate identifier is exchanged between the SSP and the information provider to identify the user or user device and is generally unrelated to the restricted information maintained at the information provider. The surrogate identifier can be persistent over multiple transactions or variable from transaction-to-transaction, depending on the application. It can be generated using any suitable technique, such as a random or pseudo-random number generator, cryptographic hash algorithm or other hashing algorithm, and the like.

Commonly, at the behest of a user, the provider requests a credential from the CA. This request can be made either directly to the CA or through a gateway.

As it may be appreciated, the provider might have "front-end" systems as well as "back-end" service component systems. In many, but not all instances, the front-end might be operated by an operator and in some cases the operator and the user might be the same.

For example, a border enforcement officer might scan a user's passport into a terminal (front-end system), which is in communication with a back-end system (such as the State Department or Department of Justice), which can provide restricted information about the user.

In another example, a cashier swipe or enter card information into a point of sale (POS) system (front-end), which is connected to a back-end service for processing. As may be appreciated, in many instances, it might be a user (and not the cashier) who scans, swipes or enters card information into a POS or web portal or mobile device for a transaction.

Upon receiving this request, the CA can generate a token for the provider and returns it to the provider.

This token can identify the provider and include a variety of information pertaining to the provider. Such information might include a description of the value being offered by the provider as well as where the credential is to be sent. The address to where the credential is to be sent may point to the provider itself and in particular to a specific front-end or to an agent of the provider.

As an example, an agent might be a travel agent that works onsite or remotely for a Travel Management Company (TMC). In this example, the terminal, which might be a personal computer, a tablet, a mobile device or some other connected device, is the front-end. The terminal is often connected to the back-end service of the TMC or another party such as a Global Distribution System (GDS) or both.

The provider transfers the token to the user and this transfer can be facilitated manually, electronically, wirelessly including means such as an image, sound, etc., as well as over phone lines or over the internet using fixed, hardline connections or wireless connections or both.

The user can then transfer that token along with other information as described above to the CRA. The transfer of the token and the additional information can be directly to the CRA or though a gateway.

Once the token and the additional information is received by the CRA, it is provided to the AS which validates the additional information and checks the validity of the token with the CA. The interaction between the AS and CA as shown in may be loosely coupled and could also be in the form of a publish-subscribe model—i.e. the CA publishes the token to the AS is a secure, encrypted manner.

The AS, upon validating the token as well as the additional information provided, can extract the relevant information and send it to the CAS. The CAS may reside at a third-party information provider that has the ability to identify the user and authorize the transfer of restricted information sought by the provider.

It is intended that a user might have relationships with multiple entities and therefore there might be multiple CAS systems. Similarly, each CAS supports multiple users.

Once the CAS has processed and established the identity and other parameters, the restricted information desired by the provider is sent from the CAS to the AS and then on to the provider. It might also be the case that the desired restricted information as well as other subsequent value items may be sent direct from the entity at which the CAS resides to the provider or its agent.

Each of the services can have a distributed, encrypted ledger L that is associated with it. These ledgers all communicate with each other using existing well known internet protocols as well as other well known protocols that operate on wireless, wire-line, optical or other communicating means to update the transactions in each ledger. The transfer of value is verified repeatedly through the ledgers such that the transfer of value can be interrupted, delayed or reversed in the event that the ledgers do not tie.

A difference from conventional methods can be that authorization for consumption of value is tied to the user instead of any particular device or credential. The advantage of this difference is that the sharing of credentials for unauthorized consumption is curtailed.

For example, in current systems, an employee (user) of a corporation gains access to corporate systems (provider) by providing a username, password and perhaps an additional token into a corporate device (typically a PC or laptop or tablet). When using the current invention, that same employee gains access to the corporate system by designating an authorized corporate device, but authenticating to a separate device such as a mobile device using the invention described above where the authentication includes multiple factors including something the user has (device), something the user knows (username, password) and something the user is (biometrics). Under the present invention, the access is more deeply tied to the user rather than to a device.

In another example, access to a streaming service or gaming service or some other entertainment can now be specifically tied to a user or a set of users (—e.g. a family) as opposed to a particular device. Examples of gaming systems might include those provided by xBOX, PS3 and PS4, Nintendo and others. Examples of entertainment services might include Netflix, Amazon Prime, HBO and others. In each of these examples, the sharing of credentials for unauthorized consumption is curtailed.

In another example, access to a subscription service, might then be tied to a user rather than a particular device or credential. Examples of subscription services might include access to Microsoft365, Amazon Prime, Cable TV and others. In each of these examples, the sharing of credentials for unauthorized consumption is curtailed.

A system 100 is depicted for exchanging, particularly between unrelated or arms-length parties, proprietary, confidential, sensitive, and/or protected information (or restricted information). The system 100 includes one or more components, which may be hardware and/or software that can be included in one or more computer systems, as described with FIGS. 10 and 11. The components may include one or more of, but is not limited to, one or more user devices 102a,b, one or more networks 110a,b,c a verification system 108, one or more target (or recipient or provider) processors 112 to receive the restricted information, at least one gateway 106, and/or one or more databases 114. Each of these components will be described hereinafter.

A user device 102 can be any computer system or device used by a person or entity seeking to provide restricted information to the target processor 112. Thus, the user device may be represented by a laptop or desktop computer 102a, a user mobile device 102b, or one or more other types of user devices. There may be more or fewer user devices than those shown in FIG. 1, as represented by ellipses 104. A user can be any person, whether a person or organization, that desires to exchange protected or sensitive information. The user (computer) systems can communicate with a network 110 to send or receive data or other communications to/from a gateway 106.

The protected or sensitive information can be any type of proprietary, confidential, sensitive, and/or protected information which the user or a provider desires to restrict in its distribution or disclosure. In one example, the information is license permission to execute or access software or media content licensed to the user or user device. The user, for example, desires to use a user-based license on a device that may or may not be previously associated with him. This would permit the user to execute or access the software or media content on his or her user device or the computational device of an unrelated party. In another example, the information is a user credential, cryptosystem (e.g., cryptographic algorithm), cryptographic secret, a cryptosystem identifier, and the like. Credentials can be any attestation of qualification, competence, authority, or identity issued to an individual by another entity with a relevant or de facto authority or assumed competence to do so or attestation of authority or identity selected by the user himself or herself. Examples of credentials include academic diplomas, academic degrees, certifications, security clearances, identification documents, badges, passwords, user names, personal identification numbers, digital signatures, security keys (e.g., symmetric and asymmetric keys, such as private or public key for a cryptographic protocol), powers of attorney, login strings (e.g., username and password), machine-readable cryptographic public or private keys and other user authentication and/or verification information. In another example, the information is financial-related information, such as account information, voucher information, coupons, gift certificates, and other benefits and entitlements, and payment authorization.

The information provider system 120 is a computer system or device, such as a server, of a custodian, possessor, software or media provider or vendor, Credential Authority (CA) that issues credentials or tokens, financial institution, and the like that is authorized to maintain and access the restricted information in the database 114a. The information provider system 120 may or may not be related to the verification system 106; that is, the information provider system 120 and verification system 108 may or may not be co-located or be part of a common enterprise network. They may be operated by a common entity or by unrelated entities.

A network 110 can be any distributed processing network used to communicate information between two or more computer systems. In embodiments, the network 110 may also represent phone systems or other means of communicating information from a user device to the verification system 108, from the verification system 108 to the target processor 112, and between the information provider system 120 and the verification system 108. Thus, the network 110 can represent systems or networks for completing phone orders or other types of communication systems. A network 110 can communicate in any protocol or format. The network 110 can be an intranet, the Internet, the World Wde Web, etc. In other embodiments, the network 110 may be a public switched telephone network (PSTN) or other type of phone system.

A gateway 106 can be a system that manages communications for a private payment system 108. The gateway 106 can be any set of hardware and/or software operable to facilitate communications. The gateway 106 may be operable to form communications into one or more user device-specific protocols to be sent to the user device 102. Thus, if the user is operating a mobile device, the gateway 106 may be operable to put the private payment system communications into a format that may be received by the mobile device.

A target device 112 can be any type of hardware and/or software that is operable to receive and process restricted information. The target device 112 can include a computational device of the user or another party, ordering systems, financial institution system, payment processing system, employer or client system, and/or other recipient systems that may receive restricted information.

Figure 10:
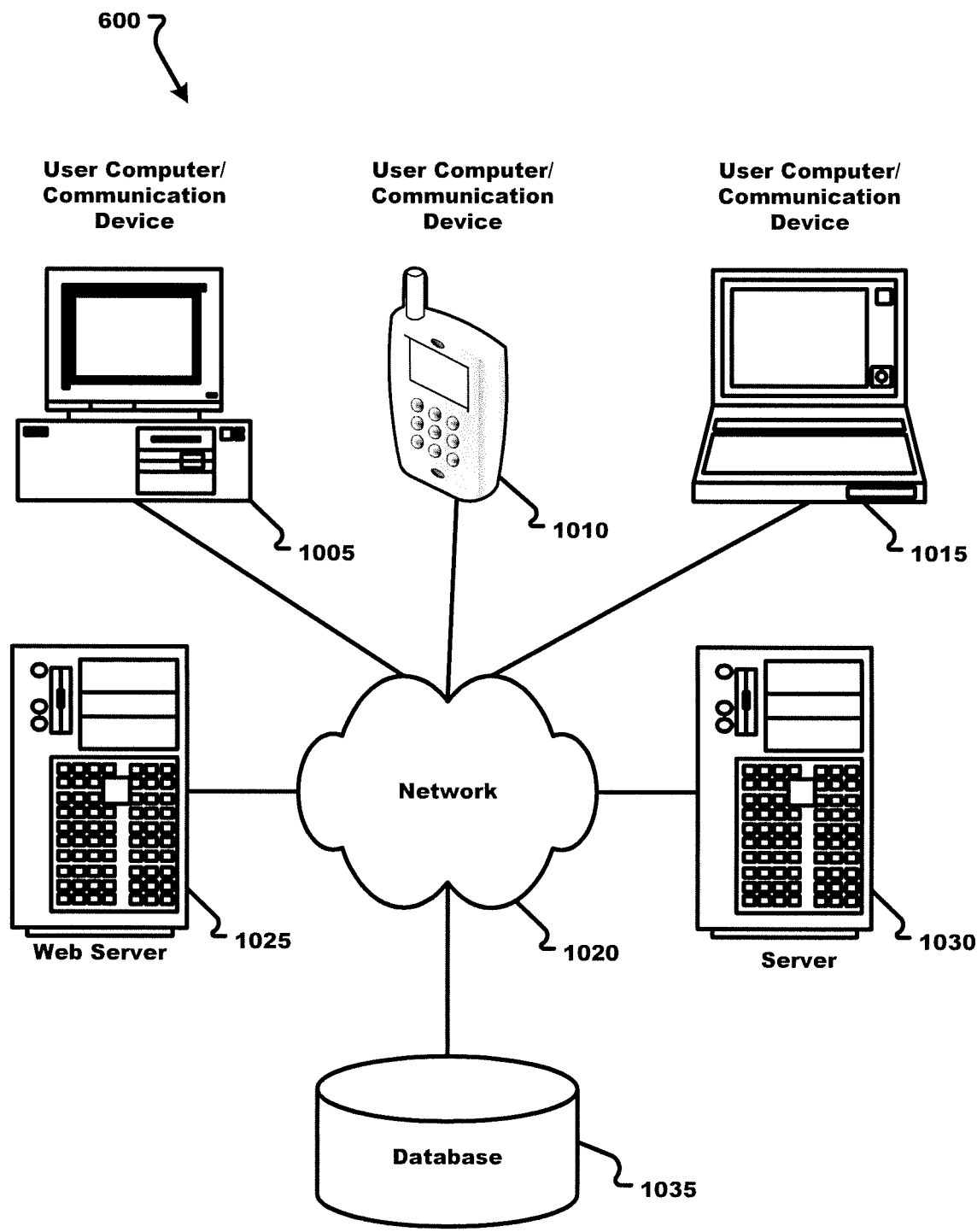
FIG. 10 is a block diagram of an embodiment of a computing environment operable to execute the embodiments described herein.
Figure 11:
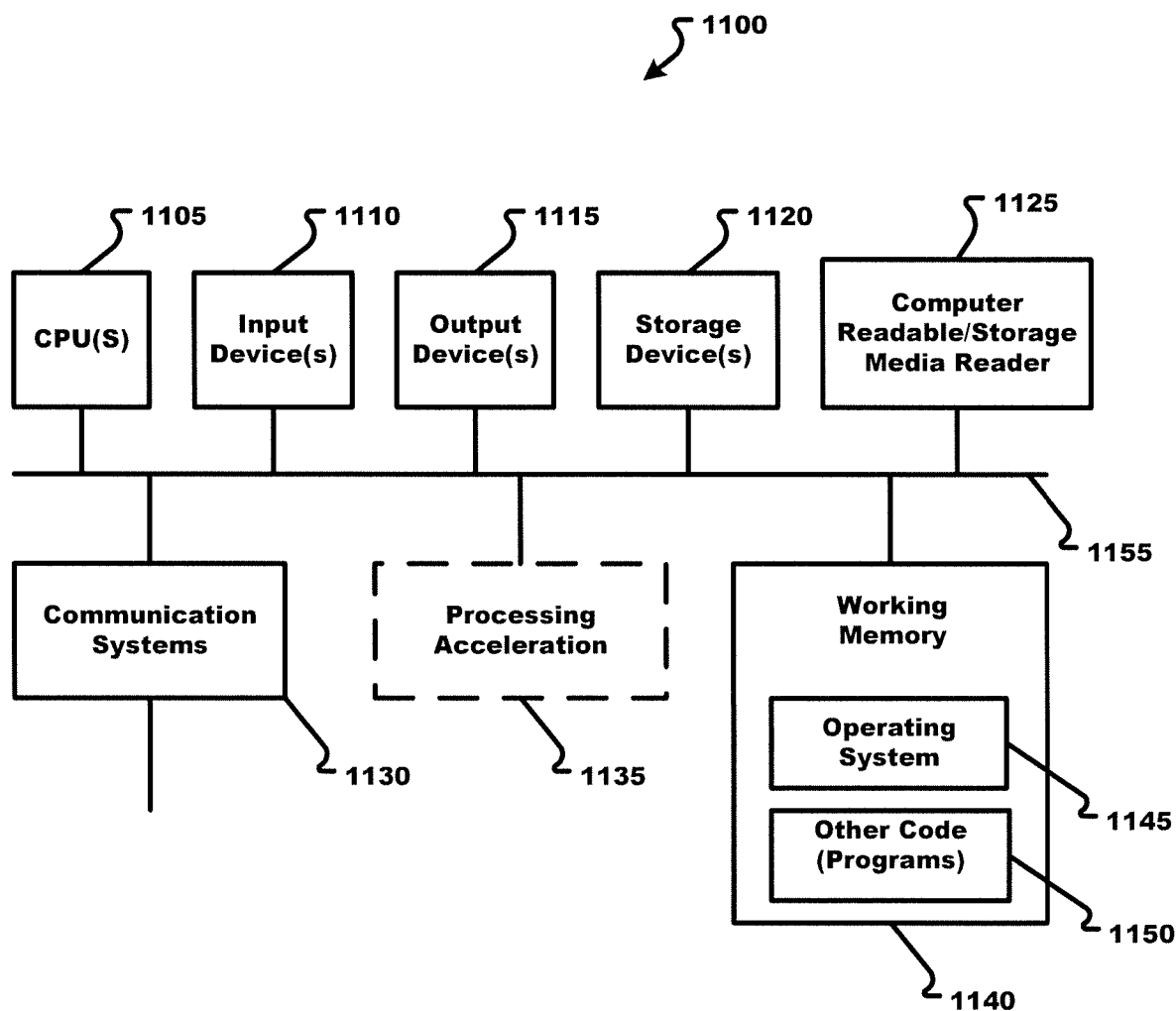
FIG. 11 is a block diagram of an embodiment of a computer or computing system environment operable to execute as the one or more devices described herein.

Each of the databases 114a,b can be any database or storage system as described in conjunction with FIGS. 10 and 11. Each database 114a,b can store information as described in conjunction with FIG. 3 or 7A through 7F, and the database 114a can store restricted information of the user, such as user credentials, license information, user account information, user account balances, and the like. The databases 114a,b may store this information in one of several different formats or by different methods, for example, a relational database, a flat file database, an object oriented database, etc. The databases 114a,b allow the information provider system 120 and verification system 108, respectively, to both store and retrieve data for processing restricted information requests to and from user devices, and/or between users and recipients. In embodiments, the databases 114a,b may be a part of the information provider system 120 or verification system 108, as appropriate, or may be a separate storage system that is in communication with the information provider system 120 or verification system 108, as appropriate, but does not store information locally.

The verification system ("VS") 108 can be any hardware and/or software operable to exchange restricted information to or from user devices 102 and/or from user devices 102 to target device 112.

Figure 2:
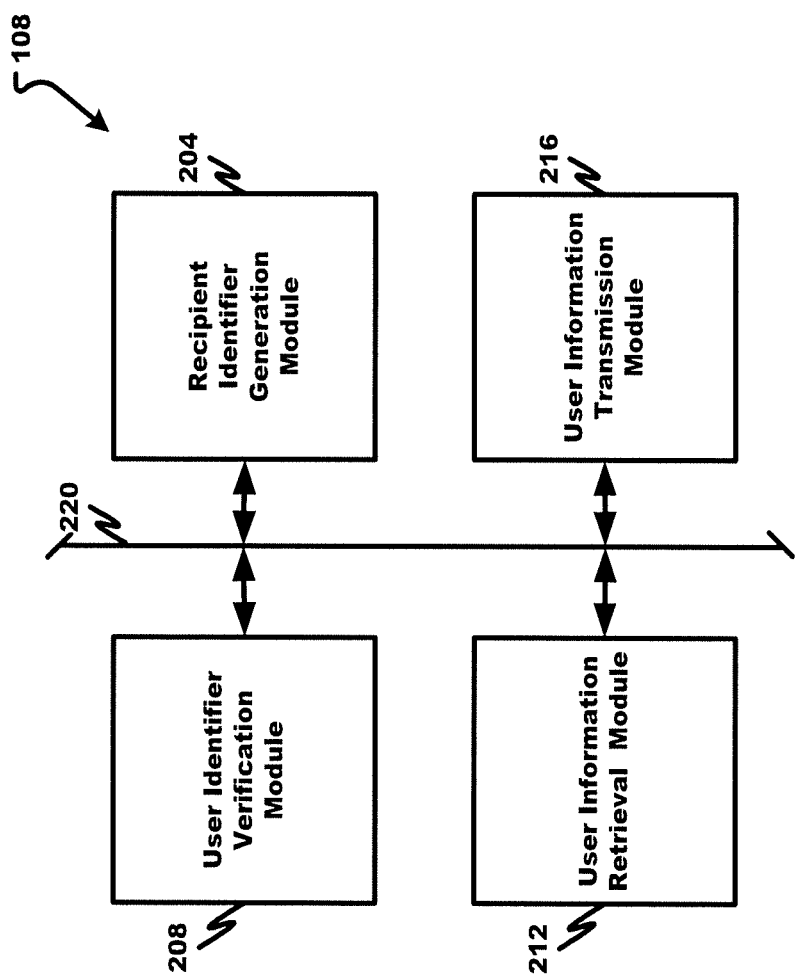
FIG. 2 is a block diagram of a verification system according to this disclosure.

An embodiment of the verification system 108 is described in conjunction with FIG. 2. The verification system 108 includes a recipient identifier generation module 204 that generates and provides to the recipient system a recipient identifier, a user identifier verification module 208 that verifies, authenticates, or validates the identities of the user, user device, and target device, a user information retrieval module 212 that accesses the requested restricted information from the information provider system, and a user information transmission module 216 that transmits securely the requested restricted information to the target device. The various modules are in communication via a signal transmission medium 220, such as a bus, local network, wide area network, and the like.

The recipient identifier generation module 204 generates and/or assigns the recipient identifier to the target device 112. In one embodiment, the recipient identifier is generated using a random or pseudo-random number generator. As will be appreciated, a random or pseudo-random number generator is a computational or physical device designed to generate a sequence of numbers or symbols that lack any pattern, i.e. appear random or pseudo-random. The random or pseudo-random number generator automatically creates sequences of numbers with apparent random properties but eventually the sequence repeats (or the memory usage grows without bound). The series of values generated by such algorithms is generally determined by a fixed number called a seed. The generator can use any suitable algorithm, such as the linear congruential generator, middle square method, a function or library routine in a selected computer programming language (e.g., for example/dev/random on various BSD flavors, Linux, Mac OS X, IRIX, and Solaris, or CryptGenRandom for Microsoft Windows™), the multiply-with-carry method, generation from a probability distribution (e.g., by the inversion or acceptance-rejection method), and the like. While the seed can be any variable, typical seeds include an electronic address or physical location of the target device or a selected person or entity, other identifier of the target device (such as a serial number), a name of a selected person or entity associated with the target device, a session identifier (including web, mobile device, tablet, etc.), and the like.

The user identifier verification module 208 verifies, authenticates, or validates the identities of the user, user device, and target device. This is done, for the user device, by comparing one or more of an electronic address or physical location of the user device or the user, a session identifier (including web, mobile device, tablet, etc.), or other identifier of the user device (such as a serial number) with one or more stored parameters or variables and, for the user, by comparing one or more of a name or credential of the user, a session identifier (including web, mobile device, tablet, etc.), other pertinent information (including an additional identifier assigned to the user, answers to one or more predetermined questions for authentication of the user, etc.), and the like with one or more stored parameters or variables. In a similar manner, this is done, for the target device, by comparing one or more of an electronic address or physical location of the target device or a selected person or entity, other identifier of the target device (such as a serial number), a name of a selected person or entity associated with the target device, a session identifier (including web, mobile device, tablet, etc.), other pertinent information, and the like with one or more stored parameters or variables. When the comparison matches, the user, user device, or target device, as the case may be, is verified, validated or authenticated successfully. When a comparison does not match, the user, user device, or target device, as the case may be, is not verified, validated or authenticated successfully.

The user information retrieval module 212 accesses the requested restricted information from the information provider system when the user, user device, and target device are verified, validated or authenticated successfully. This is done by forwarding a request to the information provider system 120 with an indication of successful authentication (and/or optionally with one or more credentials and/or an identifier associated with the user, user device, and/or target device) with a request to provide the restricted information in a secure (e.g., encrypted) manner. The information provider system 120 responds with one or more encrypted messages containing the requested restricted information.

The user information transmission module 216 transmits securely (e.g., in one or more encrypted messages) the retrieved requested restricted information to the target device. The target device, in response to receipt of the restricted information, typically performs a function or activity, such as executing licensed software, playing licensed media, approving a transaction, sending a signal to the user device, and the like.

Figure 3:
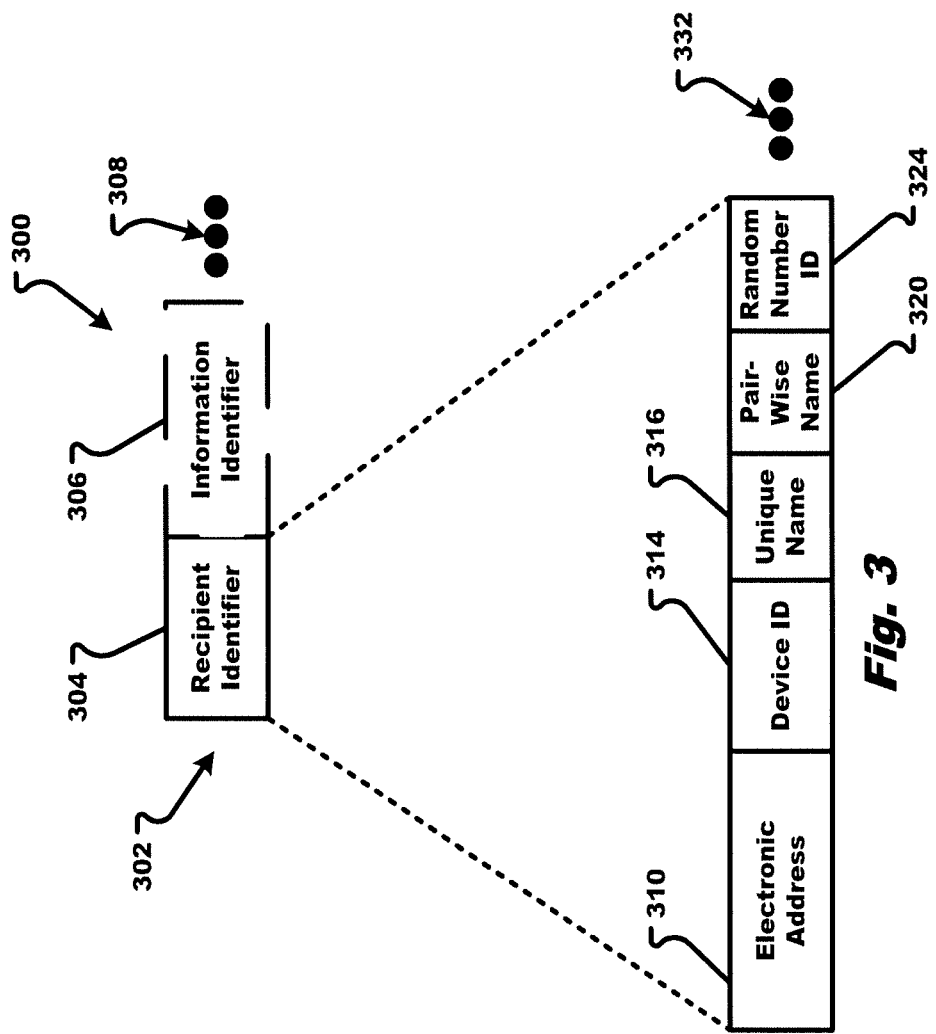
FIG. 3 is a block diagram of an embodiment of a data structure according to this disclosure.

FIG. 3 depicts a data structure 300 according to an embodiment. The data structure, which can be stored in memory (not shown) of the verification system and/or the database 114, includes a recipient identity field 304 and optional information identifier field 306. The recipient identifier field 304 is discussed above and is typically assigned to the target device by the recipient identifier generation module 204. In one embodiment, the recipient identifier 304 includes an electronic address 310, device identifier or ID 314 of the target device, unique name 316 of an entity associated with the target device, pair-wise name 320, and/or a random number identifier or ID 324. As noted, the recipient identifier 304 can be generated by a random or pseudo-random number generator using one or more of these variables as a seed. The information identifier field 306 is a description of the restricted information previously requested or authorized to be provided to the target device. Stated differently, the information identifier indicates the type, level, and/or amount of information that the target device is authorized or privileged to receive from the verification system. For example, a first target device may be authorized to receive a first type, level, and/or amount of information at the request of the user while a second target device may be authorized to receive a second type, level, and/or amount of information at the user's request.

Figure 4:
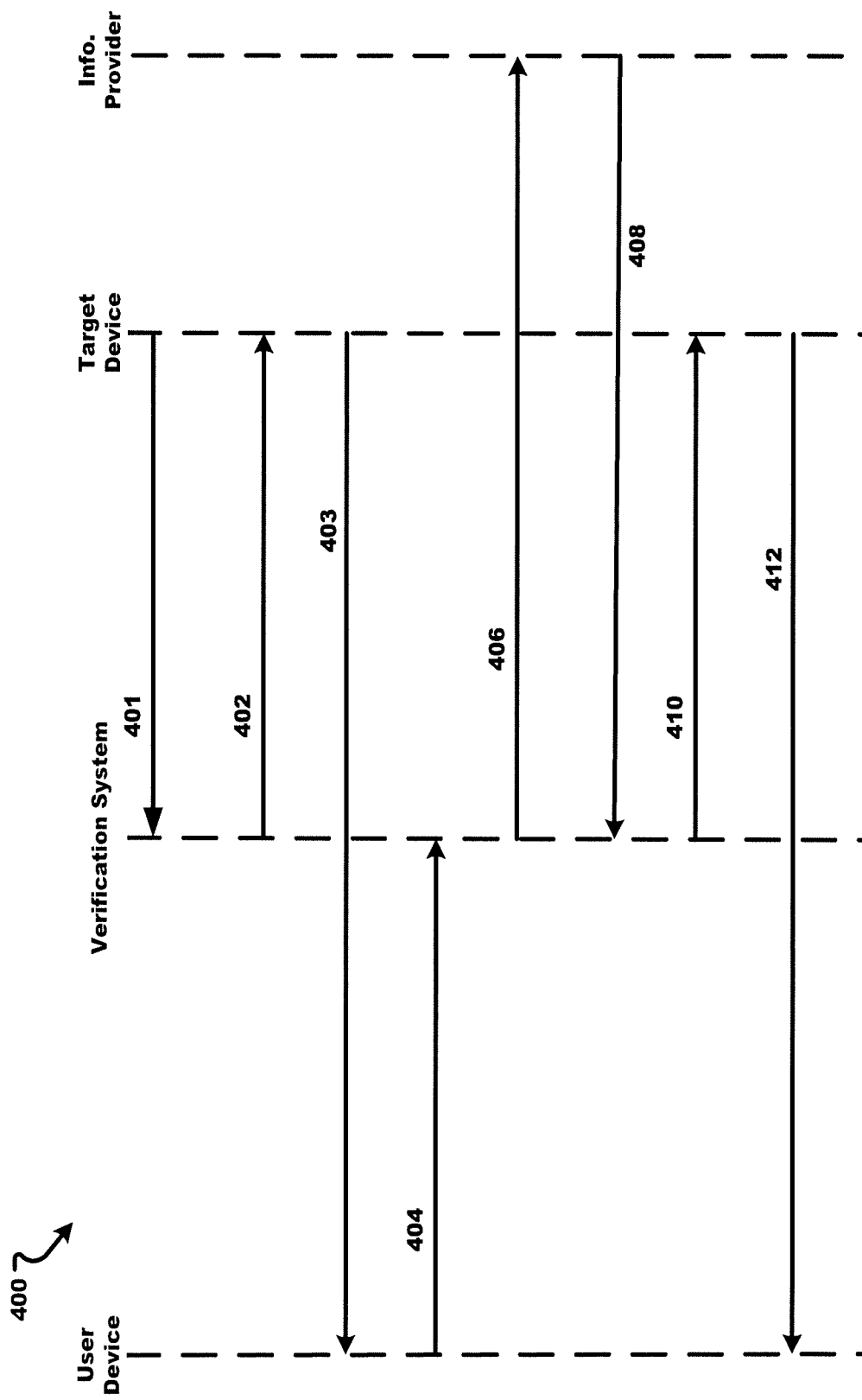
FIG. 4 is a signal flow diagram of a process for exchanging protected information.
Figure 5:
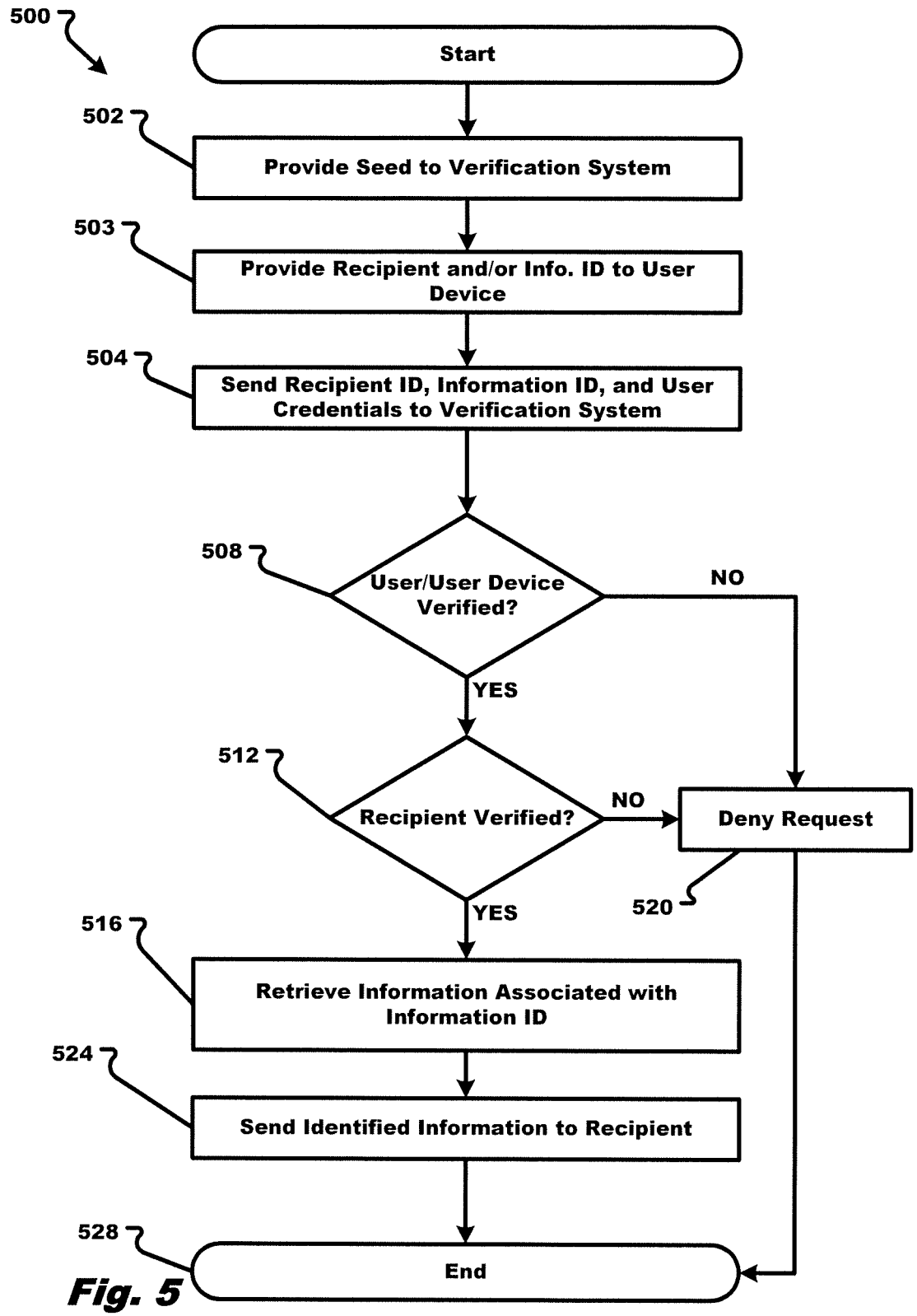
FIG. 5 is a flow diagram of an embodiment for exchanging protected information.

The operation of the verification system will now be discussed with reference to FIGS. 4-5. FIG. 4 shows the flow of signals 400, and FIG. 5 shows the logic step sequence 500.

In step 502, the target device requests 401 the verification system to provide it with a recipient identifier 304 and/or information identifier 306. The request can include the information to be used as a seed in generating the identifier. In one configuration, the seed is an identifier of an entity associated with the target device and an identifier of the target device (e.g., serial number, electronic address, etc.). In one configuration, the seed is an identifier of an entity associated with the target device and an electronic session identifier (e.g., web, mobile, tablet, etc.). The session can be the session in which the target device requests a recipient identifier to be assigned.

The verification system can generate and provide the recipient identifier and/or information identifier to the target device at any time. It may be before or during the transaction to provide restricted information to the target device.

Figure 12:
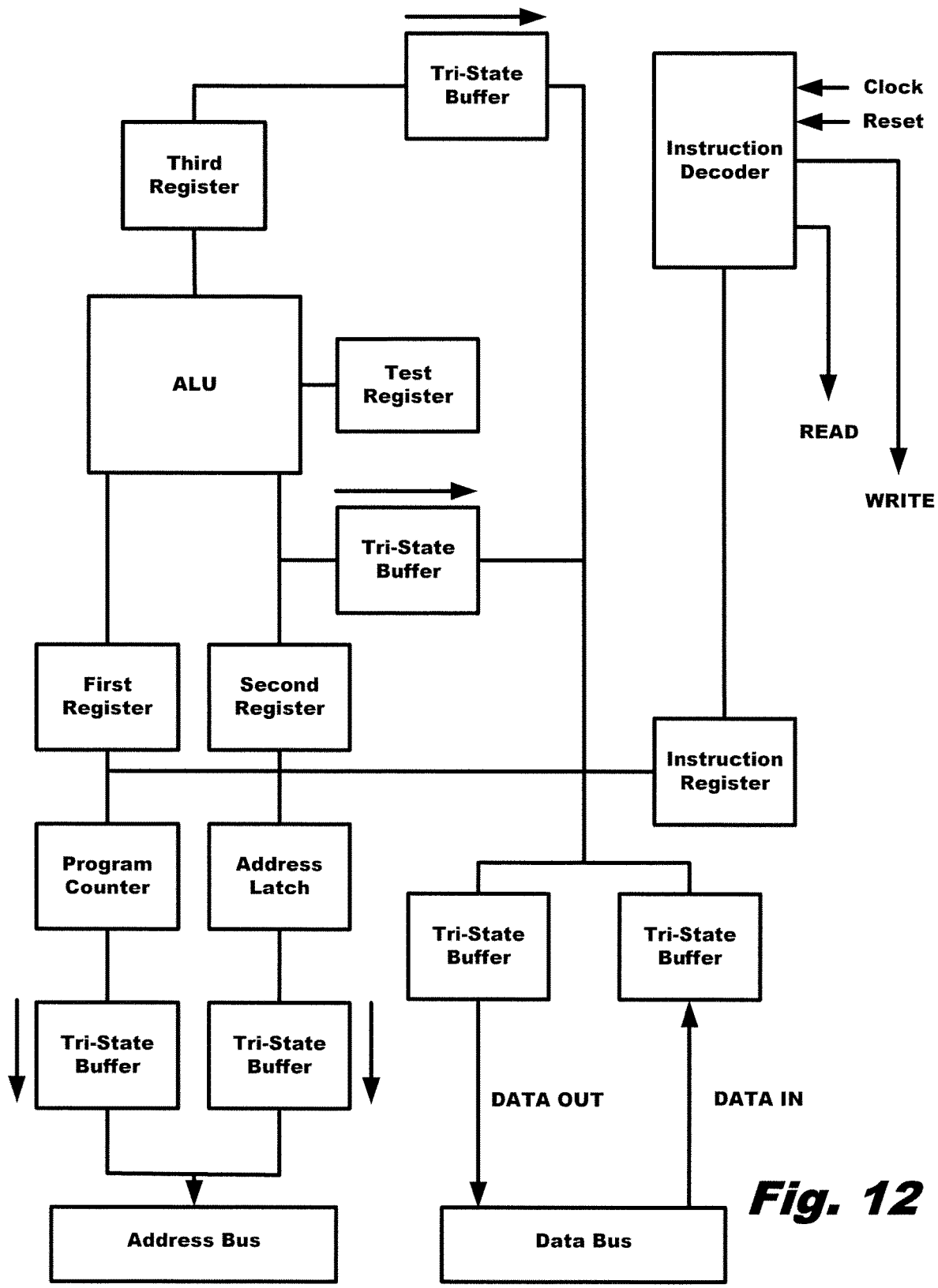
FIG. 12 is a block diagram of hardware for the verification system according to an embodiment.

With reference to FIG. 12, the verification system generates the recipient identifier using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The verification system further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the verification system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. Hardware similar or identical to that of FIG. 12 is in each of the verification system, information provider system, user device, and target device. The ALU executes instructions for a random or pseudo-random number generation algorithm and generates the recipient identifier using the appropriate seed values.

In step 502, the verification system generates the recipient identifier and/or information identifier and sends 402 it, either in encrypted or unencrypted form, to the target device. A cryptosystem can be employed when sent in encrypted form.

The recipient identifier is generated by the ALU executing algorithm instructions received from the local memory and is written to local memory, in response to a write command output by the instruction decoder, and at an address provided to memory by the ALU via the program counter and/or address latch via the address bus, with the data being provided to local memory via the data bus. The recipient identifier is also provided or transmitted to the target device by the ALU over the network via the gateway in accordance to a suitable suite of protocols, such as TCP/IP.

In step 503, the target device provides 403 the recipient identifier and/or information identifier to the user device. This can be done by manual input or by wireless or wired signal transmission. In one configuration, an application on the user device executes and collects the recipient identifier and/or information identifier through manual or audible input from the user or automatically through signaling exchanged with the target device. The application further collects, from the user to authenticate the user, one or more of credentials, such as a personal identification number, username, password, and biometric information about the person (such as a picture (e.g., facial image), fingerprint, retinal scan, and the like), and answers to one or more pre-set questions and, from the user device, one or more of an electronic address or other identifier of the user device and an identifier of an application (such as an applet or other application provided by the verification system) on the user device. Prompting of additional questions may depend on, but not limited to, geography, risk profile of the person or information provider, type of information to be exchanged, and the like.

In step 504, the user device sends 404 the collected information, including one or more of the recipient identifier, information identifier, user credentials, and user answers and one or more of an electronic address or other identifier of the user device and an identifier of an application, to the verification system over a secure channel using a cryptographic system.

In decision diamond 508, the verification system, using the collected information, verifies, authenticates, and/or validates the user and/or user device by comparing the collected information against known or previously stored variables for the user and/or user device. If the user or user device is verified, authenticated, and/or validated successfully, the verification system proceeds to decision diamond 512.

In decision diamond 512, the verification system, using the recipient identifier and information identifier, verifies, authenticates, and/or validates the target device by comparing the collected information against known or previously stored variables for the target device. If the target device is verified, authenticated, and/or validated successfully, the verification system proceeds to step 516.

Verification, authentication, and/or validation can be performed for each of the user, user device, and target device (or third-party operating the target device) using the ALU and test register. The ALU normally compares first and selected numbers and determines if they are equal, if one is greater than the other, or if one is less than the other. The test register can hold a carry bit from the last stage of the adder. The test register stores these carry bit values in flip-flops and then the instruction decoder can use the values to make decisions. The ALU sequentially and independently compares first (received) and second (stored) values each of the user, user device, and target device (or third-party operating the target device) to sequentially and independently confirm that the first and second values are identical and therefore that verification, authentication, and/or validation is successful. When the first value is greater than the second value or less than the second value, verification, authentication, and/or validation is not successful. When a comparison is performed by the ALU, the carry bit indicates whether or not the comparison matched.

The second values are read from local memory by a read command issued by the instruction decoder, with the read data being located at an address provided to the local memory by the address bus and output by the ALU and program counter and/or address latch, with the read data being received from local memory via the data bus.

When the verification system is unable to successfully verify, authenticate, or validate the user, user device, or target device, the verification system, in step 520, denies the request for restricted information and records the transaction details and result, in response to a write command issued by the instruction decoder at a memory address provided by the ALU via the program counter and/or address latch and provided to local memory via the address bus. The transaction details and result are provided to local memory by the data bus. As will be appreciated, verification, authentication, or validation will fail when the collected information do not precisely match stored variables for the user, user device, or target device (as appropriate).

In step 516, the verification system requests 406 and receives 408, over a secure channel using a cryptographic system, the requested restricted information associated with the information identifier. A surrogate identifier can also be provided to the information provider system to identify one or more of the transaction, user, user device, and target device and an indication of successful verification, authentication, or validation. The ALU executes instructions for a selected algorithm to generate the surrogate identifier, such as using the appropriate seed values. The ALU in each of the information provider system and verification system records the transaction details (including the recipient and surrogate identifiers, restricted information type requested, transaction amount, items to be provided to the user, time stamp, and the like) and result, in response to a write command issued by the instruction decoder at a memory address provided by the ALU via the program counter and/or address latch and provided to local memory via the address bus. The transaction details and result are provided to local memory by the data bus.

In step 524, the verification system or information provider system provides 410 the restricted information, over a secure channel using a cryptographic system, to the target device.

In step 528, the target device notifies 412 the user device that the restricted information has been received and terminates operation.

In each of the user and target devices, the ALU records the transaction details and result, in response to a write command issued by the instruction decoder at a memory address provided by ALU via the program counter and/or address latch and provided to local memory via the address bus. The transaction details and result are provided to local memory by the data bus.

As will be appreciated, the verification system can be distributed over the cloud. In one configuration, the various verification system components are collocated at a common node. In another configuration, the various verification system components are located at different nodes. By way of illustration, the recipient identifier generation module can be at a first node and the user identifier verification, user information retrieval, and user information transmission modes can be at a second node. The second node can reside on the premises or within the enterprise network of the information provider. Stated differently, the second node can be collocated with the information provider system to provide additional levels of security. In the latter case, different ALU's at the different locations will perform different ones of the operations above.

Certain types of restricted information are commonly not stored by the user or target device in a transaction involving the exchange of restricted information. For example, license restrictions and permissions can be enforced without providing confidential license terms and/or conditions and/or other variables to the verification system, user credentials can be exchanged between the target device and verification system without exposing the credentials to a human operator of the target device, transaction authorizations can be provided to the target device without providing any confidential account information from the information provider to the verification system or target device, and the like.

There are many instances where one party provides a credential of various types to another party or system so as to gain access to something or service of value. The party (and their representatives) that desires the item of value is the "user", and the party (and their representatives) or system that provides the value is the "provider". In many instances it is the credential offered by the user that is the sole mechanism for establishing that the user is entitled to the value offered by the provider.

A number of examples will illustrate the operation of the verification system.

In a first example, a person (or user) associated with the user device 102 has a license to use software or access media that is user- and not device-based. The user desires to run the software or access the media on the target device. The target device provides the user device 102 with the recipient identifier and/or information identifier, which the user device then provides to the verification system. The verification system authenticates the user, user device, and target device successfully and forwards one or more of the recipient identifier, information identifier, user device identifier (which can be the electronic address of the user device), credentials of the user, and notifications of successful authentication of the user, user device, and target device to the information provider system 120, which, in the example, is associated with a software vendor or media/content provider. The information provider system confirms that license restrictions applicable to the software or media are satisfied if the software or media is run or accessed on the target device and sends consent to the verification system. The verification system forwards the consent or permission to the target device to enable execution of the software or access of the media. Alternatively, the information provider system sends the consent or permission directly to the target device and a notification of same to the verification system and optionally the user device. The software or media player on the target device, in response to receipt of the consent, can run or play the licensed media.

In a second example, the user desires to provide restricted information in the form of one or more credentials to the target device, such as to enable access to or unlock the target device (due to the user forgetting his or her credentials), or to provide attestation of qualification, competence, or authority to a person or entity associated with the target device. The target device provides the user device 102 with the recipient identifier and/or information identifier, which the user device then provides to the verification system. The verification system authenticates the user, user device, and target device successfully and forwards one or more of the recipient identifier, information identifier, user device identifier (which can be the electronic address of the user device), and user credentials, to the information provider system 120, which, in the example, maintains credentials of the user. The information provider system sends the restricted information to the verification system or directly to the target device as noted above. The verification system forwards the consent to the target device.

In another example, an individual (user) purchases a ticket to a movie and when that ticket (credential) is presented to a provider (movie house). The verification system and/or information provider authenticate the credential, following which the user is granted access to the theatre to watch the movie (the item of value).

In another example, a user may be required to present a government issued form of identification (credential) to establish a user's age to access a facility (item of value) or to purchase certain products (items of value). In this example, the provider not only cares that the credential is authentic (i.e. it is not forged) but may also have a great deal of interest to be certain that the user is in fact the individual described in the credential. In fact, it is often the case that the provider has legal and other obligations to ensure that they are not selling their products or services to unauthorized individuals. Unqualified users may provide forged credentials or authentic credentials of others to gain access to the products or services of the information provider. An underage teenager using a "fake" driver's license or a friends driver's license to purchase restricted products like alcohol, tobacco, medication, weapons and ammunition or gain entry to a bar or nightclub are instances of covered by this example.

In another example, a user might enter credentials (username, passwords, personal identifiers) into a website or a system to gain access to the value provided by that system. For example, a user enters their username and password to access 1) a computer or a mobile device, or 2) a website to purchase an item from a merchant like Amazon, or 3) information on that device or another system in communication with that device. In another example, a corporate employee inputs credentials provided by their employer into the employer's computer as well as corporate systems to gain access to information from the corporation's systems, interact with it, make changes, modifications as well as delete information.

In another example, a user might write a check or use a card (credential) at a merchant to purchase an item or service. In some cases, the merchant might require the user to present identification while in other instances the card number, a tokenized version of the card, physical possession of the card is adequate for the merchant to receive authorization or confirmation (value) based on which the product is released or service is rendered.

In another example, a patient (user) provides their personal information (name, date of birth, identification number like a social security number in the United States) to a doctor or a hospital so that the doctor or hospital can access the user's medical records from another doctor or hospital.

In each of these examples, the verification system can authenticate the user, user's device, and transaction (e.g., the third-party provider) and interact with an information provider storing the user's credentials to provide notification to the third-party that the user is whom he or she claims to be. The credential can be sufficient itself to release the value, while in other cases, the credential can be used to secure an authorization (value to the provider) before the provider releases the product or renders the service. The onus is no longer on the provider to validate the credential, the user and some cases, both, before releasing the item of value. The verification system can therefore ensure the validity and authenticity of the credential, ensure the credential is properly associated with the party presenting the credential, and ensure that the credential is properly protected so that it is not inappropriately accessed or otherwise compromised. The verification system can thus reduce forging of credentials, fraudulent use of another's credentials, reduce a provider's costs in confirming proffered credentials are valid, and reduce a user's need to carry physical credentials, such as a driver's license, birth certificate, passport, and the like.

In another example, a payer user (e.g., consumer, buyer, payer, agent thereof, or any other provider of funds, etc.) desires to purchase goods or services from a merchant. The merchant is identified by a unique identifier, and the target device is a terminal of the merchant. The merchant identifier and target device identifier, merchant identifier and electronic session identifier, and/or bill of sale or other description of the goods or services to be purchased or for sale (e.g., transaction identifier and/or amount) are provided to the verification system, which inputs one or more of them as a seed in a random or pseudo-random number generator and generates a recipient identifier. In one configuration, the recipient identifier is a token encapsulating (or generated from) the transaction identifier, merchant identifier, and transaction amount. The user device sends the collected information and recipient identifier to the verification system. In one configuration, the recipient identifier is generated from one or more of the merchant, target device, and electronic session identifier(s). The verification system provides the recipient identifier to the target device. A payer user associated with the user device desires to purchase goods or services from the merchant and enters or receives the recipient identifier and optionally transaction amount into an application on the user device. Additional credentials, such as a personal identification number or answers to predetermined questions may be required from the payer user, depending on geography, risk profile of the merchant, and transaction amount. The verification system uses the recipient identifier to bind the payer user to the transaction and, with assistance of the information provider (which is a financial institution) and through a secure and encrypted session, authenticates the payer user, user device, and transaction (e.g., authenticates that the account of the payer user (which is not provided to the target device, merchant, or the verification system) has a sufficient available balance to cover the transaction amount and that the merchant is an authorized merchant). In one embodiment, the verification system maps the credentials of the payer user and/or user device electronic address or other identifier to a user payer identifier. The user payer identifier (or surrogate identifier) is a token or hash or some other hiding technique that is used by the information provider system to associate the payer user with an account number at the information provider. After authentication is successful, the verification system sends approval to the user device and/or target device. In the former case, the payer user, with the user device, can verify the transaction and accept or decline it. For further evidence of user payer authentication, additional personal credentials or answers to predetermined questions may be required in this optional step. In the latter case, the approval can be an approval code that uniquely identifies the merchant, target device, or electronic session. Approval is displayed on a screen of the target device. Optionally, a transaction completion notice can be sent to the user device for display to the payer user. The payer user accepts the goods or services. The transaction is settled with the merchant through the financial institution and typically includes all authorizations, the merchant identifier, the target device identifier, electronic session identifier and transaction amount. Funds can only be paid to the merchant. The merchant identifier can designate one or more merchant bank accounts only into which settlement funds can be paid or transferred. This can enable secure debit or credit transactions, such as using a credit or debit card via a credit or debit card issuer.

The verification system can support multiple transaction forms.

In a first transaction form, one or more of the merchant ID, target device ID (e.g., for brick and mortar transactions), and recipient ID is/are pre-assigned. The merchant provides, via the target device, one or more of merchant name, business type or classification, physical address, incorporation state, officer information, financial institution information for funds deposit (e.g., bank account number and/or wire transfer information), transaction history, online session and transaction volume, and fixed item token volume. In response, the merchant receives one or more of merchant ID, target device ID, recipient ID, allocation or electronic session ID, and allocation of fixed item token. The payer user enters (or the user device is automatically populated with) one or more of the merchant ID, target device ID, and recipient ID and sends the ID information to the verification system.

In a second transaction form, the merchant requests a recipient ID in the form of a transaction token for each transaction and provides the information in the prior paragraph. The token incorporates one or more of the merchant ID, target device ID, recipient ID, electronic session ID, and transaction amount and can be used by the financial institution to determine merchant account type (e.g., credit vs debit line), merchant account number, and transaction amount. It can also include or incorporate a purchased item list, promotion, and merchant physical location. The information can be provided to the payer user or user device for transmission to the verification system or directly to the verification system. The payer user, via the user device, receives the token from the verification system and approves or authorizes the transaction.

In either of the first or second transaction forms after the transaction is authorized on the user device by the payer user, the verification system sends an authorization code or transaction denial depending on the restricted information received from the information provider (e.g., financial institution of the payer user). The verification system also sends to the target device the authorization code or transaction denial and, if the transaction is authorized, the shipping address and quantity for a fixed code transaction.

In either transaction form, the information entered by the payer user into the user device can also be automatically populated once the payer user associates with the merchant, target device, and/or electronic session. Such association can be, for example, through check-ins, beacon technologies, NFC, opt-in, and other methodologies.

A distributed encrypted ledger can be maintained by each of the verification system, information provider system, user device, and target device. The purpose of the ledger is to maintain a record of every transaction in the system—every credential issued, every credential authorized by a user, every credential and user that is approved, and every transfer of restricted information (or value). Thus, after each transaction the ALU writes in memory, via the data bus, transaction details to an address output to memory, via the address bus, by the ALU and address latch and/or program counter. A write command is issued by the instruction decoder. The settlement of the ledger indicates that all the transactions have been validated and issued by the appropriate sub-system. Settlement is performed by the ALU of each of the verification system, information provider system, user device, and target device using the test register as noted above. The stored values are read in response to a read command issued by the instruction decoder and from an address issued by the ALU and the address latch and/or program counter via the address bus and received from local memory via the data bus. Transaction details received from another of the verification system, information provider system, user device, and target device are compared (in the manner discussed above) against stored values maintained in local memory by the ALU of the receiving verification system, information provider system, user device, and target device, as the case may be. Any intrusion into the system will result in the ledger recording one or more transactions that do not reconcile and this lack of reconciliation results in the suspension of transactions at the points of reconciliation failure. Since the ledger is encrypted, the fraudulent manipulation of the ledger is difficult. Since the ledger is distributed, there is no one central authority that maintains the ledger and therefore there is not a specific, central point of manipulation of the ledger.

Following either transaction form, settlement activities can be performed. The verification system can send to the payer user and/or merchant for review a list of transaction authorizations involving the payer user over a specified time period and transaction amounts for each listed transaction. Any discrepancies or other changes received by the verification system can be forwarded to the financial institution before final settlement with the merchant. The verification system can also send to the financial institution for review a list of authorizations, target device identifiers, and transaction amounts among all payer users over a specified time period. The financial institution can send proof of funds transfer and any list of discrepancies to the verification system.

As can be seen from the above, the verification system ("VS") can generate a token that tokenizes the merchant and transaction but not the payer user or the payer user's payment information. The merchant tokens have no value to anyone other than the merchant as it can only be used to pay the merchant and no one else. The verification system can facilitate the purchasing of services and goods between payer users and merchants, or between two or more users, without providing payer user financial data to the third-party, whether another user or a merchant. The link between the payer user and the verification system is outside the payment rails through a connected device, with the contents being sent on the link including but not limited to transaction amount, merchant identifier, terminal or target device identifier, electronic session identifier, authentication queries and responses, confirmation queries, and responses. The link can also carry communications from a merchant to a payer user that include but not limited to discounts, promotions, offers, rewards, incentives, and notifications.

The VS can have other advantages for financial transactions. The merchant will not handle payer user payment credentials or account information, thereby reducing liability to the payer user in the event of inadvertent disclosure of such credentials or account information by the merchant. It can enable secure, low-risk and low-cost transactions between merchants, financial institutions and payer users. It can apply to both credit and debit transactions and any currency, including digital currency such as Bitcoin™ and others. Debit transactions can include any stored value including bank accounts, gift cards, vouchers, and coupons.

The token can identify the third-party and a product or service associated with the transaction. The payer user can provide the token to a verification system which communicates with the financial institution of the payer user (e.g., consumer) to pay the third-party using information in the token. After receiving payment, the third-party can provide the product or service.

The embodiments of the methods and systems for conducting the financial and commercial (buying, selling, donating, gifting and paying) transactions can leverage communication devices to avoid the disclosure of a payer user's payment information. In embodiments, the third-party (seller, seller's agent, receiver of funds, etc.) provides information or a token to the payer user who then directs fund to that token. In other words, rather than the payer user providing information that is used by the third-party to "pull" funds, the embodiments allow a third-party to provide information to which a payer user "pushes" a payment. Since the payment is "pushed" by a payer user, and often, but not always, using some type of a communication and/or computing device, the point-of-sale (POS) terminal has essentially been transferred from the merchant to the payer user.

Third-party tokens can have different forms. The token can uniquely identify the third-party and may also identify a product or service or any other reason for the payment. One example of a third-party token (or information that may be included in the token) is a universal payment identification code (UPIC). A UPIC is a unique bank account identifier that has been established by financial institutions in order to allow merchants and other organizations to receive electronic payments without disclosing their account information. UPIC was developed by the Electronic Payments Network (EPN).

Another example of a token, albeit significantly less secure for the third-party, is the third-party's account number and routing number at a financial institution, for example, a bank or credit union account number and routing information. Another example might be a unique name or handle, such as, a mobile phone number or a combination of a merchant identifier (name, unique number, etc.). Another example might include a handle or name that is pair-wise unique (i.e., the handle is unique between a pair of individuals—e.g., "mom," "dad," "Dave," or "JT").

A merchant can include the token in an advertisement, announcement, catalog entry, webpage, or any other statement about a product or service offered. The token might consist of or be derived from a merchant identifier and a product identifier (stock keeping unit (SKU) number). A purchaser or payer user of that merchant's product or service may then "push" a payment to that token using a Verification System (VS) described herein. The merchant, upon receiving notification of a payment received, can deliver the product or service to the payer user either directly or through an agent. The merchant advertisement or statement may be on TV, on a billboard, in a newspaper, on a radio broadcast, on an internet website, or sent to a mobile phone.

The merchant code can be any tag that uniquely identifies a particular merchant or a store. For example, the following table lists some well known merchants and some possible merchant codes or tokens:

| Merchant name | Possible codes |
| --- | --- |
| Saks Fifth Avenue | SAKS |
| Neimann Marcus | NM or Neimarc |
| Starbucks | STRBKS |
| Ann Taylor | ANTLR |

In another example, a merchant could sign-up with the VS and can register a merchant code. A merchant who has signed up with the VS can use the merchant code and a product number (for example, a product number in a catalog) to facilitate a purchase the product. To purchase the product, the payer user communicates the merchant code and product number to the VS. The VS confirms the product, its price, and fulfillment mechanism (i.e. where to send the product or service that was purchased—for example, send to payer user's email, home address, or work address). Then, the VS confirms the payer user's choice of payment (debit account or credit account—setup by the payer user). The VS authenticates the payer user and completes the transaction by sending a payment confirmation to the merchant along with a purchase order complete with shipping address and instructions. The payer user's selected item is then shipped by the merchant to the payer user and the transaction is complete. In this transaction, the payer user's payment information was never transmitted to the merchant. The merchant never having taken possession of the payer user's payment information does not have to incur any liability surrounding its security.

The VS can facilitate "push" payment and purchasing. The VS can include a switch. A payer user wishing to facilitate a payment or purchase communicates with the VS through a communications gateway using communications protocols that include but are not limited to short message service (SMS), instant messaging (IM), unstructured supplementary service data (USSD), e-mail, interactive voice response (IVR), etc. In the message to the VS, the payer user communicates the third-party's token to the switch. The switch, through a token sub-system interacts with the merchant associated with that token. In particular, the token sub-system interacts with merchant's product data store, which may be off-site or local to the merchant, to determine the product being purchased by the payer user. The switch, after authenticating the payer user and establishing availability of funds, generates a purchase order. A payment and order processing sub-system of the VS sends a purchase order, along with notification of payment of funds to the merchant's bank or UPIC, to the merchant's order processing system to complete fulfillment. The purchase order also includes fulfillment instruction including where the product or service is to be sent (physical address, email address, mobile device, etc.)

The payment and order processing sub-system can generate the payment transfer instructions and send the funds to the VS funds sub-system or bank, which then transfers payments to the merchant or third-party's bank or UPIC via automated clearing house (ACH) transmission or an electronic funds transfer (EFT). A copy of the purchase order and a confirmation of the payment (including tracking information obtained from the merchant) is sent to the switch, where the switch can store a copy and send it to the payer user.

The authentication of the payer user is carried out by the authentication sub-system. The authentication sub-system can use a multi-factor authentication. For example, the multiple factors may be: a) an authorized phone number (mobile phone, home phone, office phone, etc.); b) a personal identification number (PIN) or password; c) the activity, which can trigger additional or different checks, for example, a restricted fulfillment, i.e., the product or service is restricted to a limited set of addresses (physical or electronic) that can be under the control of the payer user, or a change of addresses. In other words, even if a) and b) were compromised the benefit of the payment is restricted to pre-set fulfillment addresses.

In another example of when addition authentication is sued, a payer user may use the VS is used to transfer funds to another VS payer user. If the payer user is trying to transfer funds to another payer user, then additional challenge questions can be posed by the authentication sub-system that must be answered by the payer user before the transaction can be completed. The authentication sub-system mat also determine the authenticity of the transaction based on other metrics or may pose challenge questions.

The VS may offer a payer user the ability to make either a debit payment or a credit payment. In case a debit payment is chosen, then a debit sub-system can verify the payer user's balance, sequester the requisite amount for the payment, authorize the payment and notify the VS of the authorization. If the debit funds are inadequate, then the debit sub-system may notify the switch, which can then notify the payer user. The payer user may then choose to use credit through the credit sub-system or replenish the debit account.

The credit sub-system can verify a payer user's credit limit to determine whether the purchase amount can be supported. If the purchase amount can be supported, then the switch is notified and the transaction is completed. If the purchase cannot be supported, the payer user is notified or the credit limit is increased based on the payer user's credit worthiness. Credit worthiness may be determined by methods well known to those skilled in the art.

The fulfillment sub-system can control the delivery of product and services. The fulfillment system may store or contain the payer user's pre-determined methods that are to be used for delivery products and/or services. Thus, the data stored by the fulfillment system can include electronic and physical addresses. The pre-determined addresses can be changed but only through additional electronic access, which is secured with additional passwords, pins, and other security measures.

The payer users of the VS can setup or establish their profile and related information. This information may be stored and maintained in the payer user profile subsystem (UPS). The UPS may store a payer user's information, which can include one or more of, but is not limited to, name, address, electronic address, phone number, transaction phone number, date of birth, social security number, etc. A payer user can also setup a network of friends and family by importing contact information from an existing contact system (like MS Outlook™), Facebook, their handset, or other systems. The entry of the information may be automatic or manual. A payer user may attach a special name or tag with some (or all) of the contacts. For example, the payer user may use the tags "Dad," "Mom," "Uncle Dave," "Grandma Susan," etc. These special names, tags, or handles can be stored as tokens described earlier for facilitating payments and/or gifting between VS payer users.

In addition, each payer user can setup funds transfer vehicles. Such vehicles can include one or more of, but are not limited to, bank account(s) (with account number, routing number, and/or other identifiers), re-loadable gift cards, merchant cards (e.g. Starbucks cards), payroll cards, debit cards, etc. The vehicles may provide the payer users with the ability to transfer funds into their VS accounts from their bank accounts, gift cards etc. The transfer vehicles can also provide individuals in a payer user's network to transfer funds into the payer user's account(s) or cards. Finally, transfer vehicles may allow a payer user to setup one or more anonymous handles, which can be used for transactions with "strangers" to whom a payer user may not wish to divulge phone numbers, names, or payment information. Such a capability is useful when individuals are making purchases of goods and services advertised in newspapers, electronic boards (like Craigslist), and other media. The payer user may also establish a default currency in which transactions are to be made. For example, payer users in the United States will have a default currency in U.S. dollars.

In addition to transaction with merchants, the VS 600 can also be used to facilitate transactions between individuals. Individuals might be members of a professional, family, or social network, and the transactions envisioned might include, but are not limited to, payments, gifting, and establishing tabs (funds owed between individuals).

A verification system or VS 600 according to another embodiment can affect payments or other transfers to and/or from payer users and/or third parties (e.g., merchants, vendors, retailers, wholesalers, sellers, and the like) to purchase services and goods as set forth above. The verification system 600 can include one or more components, which may be hardware and/or software that can be included in one or more computer systems, as described with FIGS. 6 and 7. Each of these components will be described hereinafter.

The person associated with the user device 102 can be any payer user, whether a person or organization, that purchases services or goods.

The target device 112 is operable to process orders for or requests for information about goods or services and/or to receive payment for goods or services. The target device 112 can include ordering systems, financial institution systems, and/or other systems that may receive payment and/or process orders to be sent to a user device 102.

The database 114 can be any database or storage system as described in conjunction with FIGS. 10 and 11. The database 114 can store information as described in conjunction with FIGS. 7A through 7F. The database 114 allows the verification system 600 to both store and retrieve data for processing payments to and from users, and/or between users and third parties. In embodiments, the database 114 may be a part of the verification system 600 or maybe a separate storage system that is in communication with the verification system 600 but does not store information locally. The database, for example, can be maintained by the information provider, which is a financial institution or bank.

The verification system 600 can be any hardware and/or software operable to process payments to from user devices 102 and/or from user devices 102 to third parties 612. An embodiment of the verification system 108 is described in conjunction with FIG. 6. The verification system 108 can receive tokens from a user device 102 that allows the verification system 600 to direct payment to a third-party 612. Further, the verification system 600 can process orders for the user device 102 from the third-party 612. Thus, the verification system 108 can facilitate the purchasing of services and goods between users and third parties 612, or between two or more users, without providing user financial data to the third-party, whether another user or a third-party 612.

Figure 6:
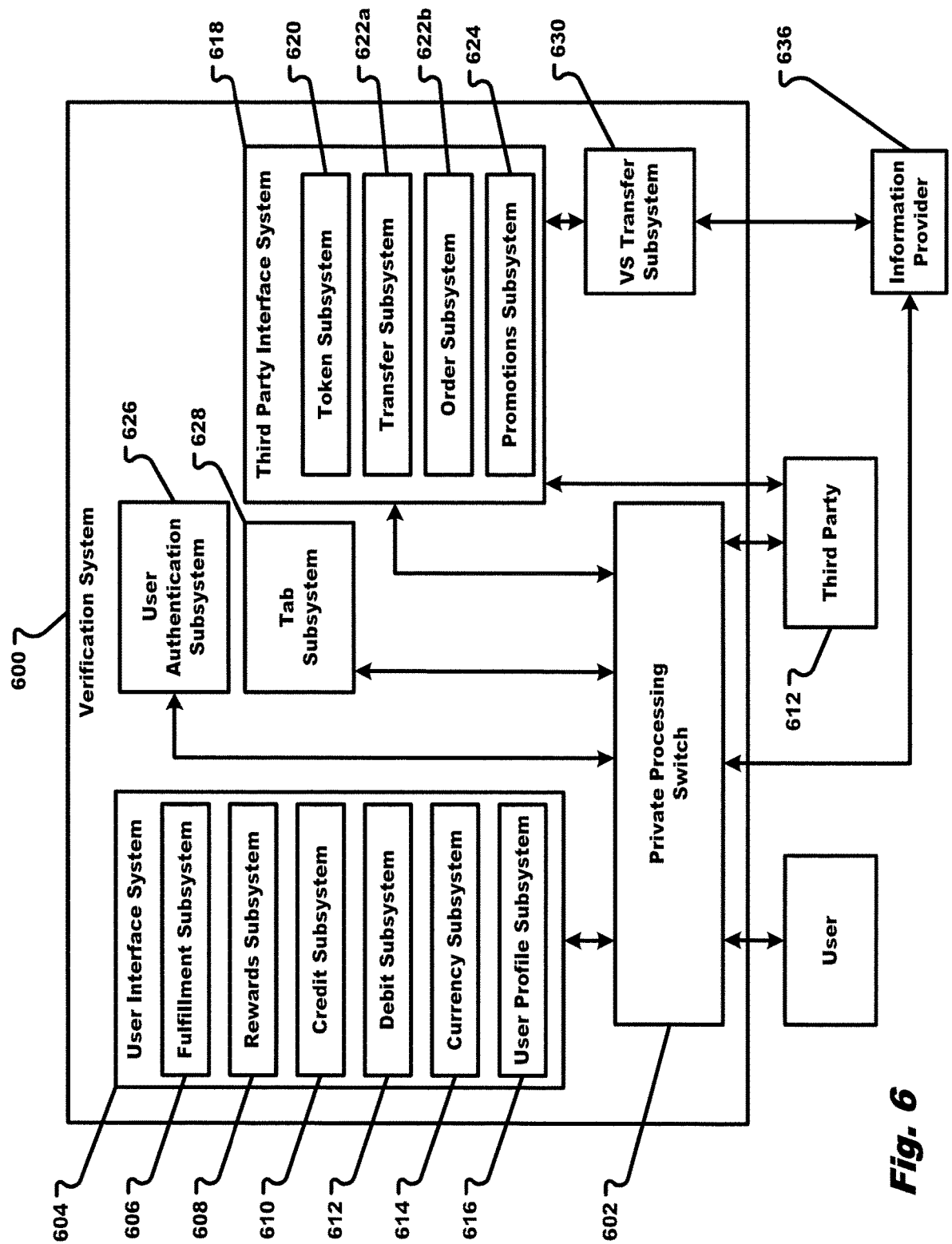
FIG. 6 is a block diagram of an embodiment of a verification system according to this disclosure.

The embodiment of the verification system (VS) 600 is described in conjunction with FIG. 6. In embodiments, the verification system 600 can include one or more of, but is not limited to, a user interface system 604, a private processing switch 602, a third-party interface system 618, a VS transfer subsystem 630, a user authentication subsystem 626, and/or a tab subsystem 628.

The private processing switch 602, in embodiments, can be hardware and/or software. However, the private processing switch 602 will be explained as being a software module hereinafter, but the embodiments shall not be so limited. The private processing switch 602 is able to receive communications from the user device 102, the third-party 612, the information provider (e.g., financial institution(s)) 636, or other external entities to the verification system 600. The private processing switch 602 can reroute the communication(s) to one or more subsystems within the verification system 600. As such, the private processing switch 602 functions as an engine to provide functionality to the verification system 600 and complete transactions conducted by the verification system 600. In embodiments, the private processing switch 602 receives communications from a user device 102 and sends the user device communications to a user subsystem 604.

The user subsystem 604 is operable to conduct one or more functions in response to user device interactions. Thus, the user subsystem 604 can include one or more subsystems, which can complete the one or more functions for the user device. The one or more subsystems can include one of more of, but are not limited to, a fulfillment subsystem 606, a reward subsystem 608, a credit subsystem 610, a debit subsystem 612, and/or a currency subsystem 614. Each of these one or more subsystems will be described in more detail hereinafter.

A fulfillment subsystem 606 may be operable to complete the payment of tabs or other orders or financial transactions for the user. As such, the fulfillment subsystem 606 can interact with one or more other subsystems to receive money that may then be forwarded to the private processing switch 602 to send to a third-party interface system 612. The fulfillment subsystem 606 can take in one or more tokens, determine a price or receive a price for a service or good, and then arrange for the payment of the service or good. The fulfillment subsystem 606, in further embodiments, can also control the delivery of a product or service. Thus, the fulfillment subsystem 606 can receive information from a user device 102 about how a product or service should be delivered to the user. In embodiments, the user can determine, for all products or services ordered through the verification system 600, how delivery should be completed and pre-set the delivery methods. For example, the delivery address for a product may be provided or the default device to download software may be provided, or other information to complete the fulfillment of the order may be provided and stored. Thus, the fulfillment subsystem 606 can save any predetermined methods or data, such as, specific electronic or physical addresses, to be used in the delivery of a product or service. This information may be stored in the database 114. In embodiments, the data can only be changed through specific passwords or additional security measures, such that, this information can only be controlled by the user and is maintained securely within the verification system 600.

A rewards subsystem 608 can maintain rewards data for the user. A rewards subsystem 608 can function to offer purchase rewards similar to a customer appreciation or loyalty program, as offered through one or more retailers. Thus, the rewards subsystem 608 provides the same type of user benefit as those systems while the user employs the verification system 600. In other embodiments, the rewards system 608 can store the rewards offered from the third parties that are provided to the verification system 600 after the purchase of a good or service. Thus, the reward subsystem 608 can provide a clearing house for rewards to the user while giving the user a single interface to review rewards from two or more third parties.

The credit subsystem 610 can be operable to pay for services or goods requested by the user using a credit payment. In an embodiment, the credit payment may be from a user's credit card or other account provided to the credit subsystem 610 by the user. In other embodiments, the credit subsystem 610 functions as a credit account. Thus, the credit subsystem 610 can maintain a credit account for the user with a credit limit. The credit subsystem 610 can verify whether the purchase price is lower than the user's credit limit. If the price is below the user's credit limit, the credit subsystem 610 can approve the purchase and inform the private processing switch 602. The private processing switch 602 can then direct other subsystems to complete the order. If the user's credit limit is not above the purchase price, the credit subsystem 610 can either disapprove of the purchase (a disapproval message is then sent to the private processing switch 602) or can increase or change the user's credit limit to complete the order. Thus, the credit subsystem 610 provides a method for payment of goods or services through the verification system 108 that allows the user to use credit rather than debit or other forms of payment.

In other embodiments, the user may pay for the good or service using a debit subsystem 612. The debit subsystem 612 can maintain an account holding a payment or balance for the user. The debit subsystem 612 can verify the purchase price of any good or service against the user's balance. If the purchase prices is less than the user's balance, the debit subsystem 612 can sequester the purchase price amount and inform the private processing switch 602 that the funds are available to purchase the good or service. The authorization may be sent to the private processing switch 602, such that, the private processing switch 602 can direct other subsystems to complete the transaction. However, if the debit account has inadequate funds, the debit subsystem 612 can notify the private processing switch 602, which may then notify the user device 102 that there are inadequate funds to use the debit subsystem 612. The user may then direct the private processing switch 602 to replenish the debit account stored with the debit subsystem 612. In other embodiments, the user may choose a different payment system, such as, the credit subsystem 610.

The currency subsystem 614 affords the user the ability to purchase goods from foreign vendors or to use different types of currency in purchasing goods or services. In embodiments, the currency subsystem 614 can convert the currency being used by the user into some other form of currency. Thus, the currency subsystem 614 can maintain current exchange rates or be able to retrieve current exchange rates for different types of currency. The currency subsystem 614 can receive a purchase amount in a first currency and convert the purchase amount to a different currency to be used with the other subsystems in the user interface system 604. In embodiments, the private processing switch 602 may direct any order through the currency subsystem 614 before sending that order on to the credit subsystem 610 or debit subsystem 612. In other embodiments, the credit subsystem 610 or debit subsystem 612 may contact the currency subsystem 614 when a conversion is necessary.

A user profile subsystem 616 may be operable to create a profile of the user. The user profile subsystem 616 can retrieve or receive information about the user. This information may include the users name, one or more identifiers (such as, a social security number), phone numbers, electronic addresses, or other information that is associated with the user. This user information may be stored in the database 114 and used either in payment or in order fulfillment by the user interface system 604 or one or more other systems in the verification system 600.

The private processing switch 602 may also communicate with the third-party interface system 618 to conduct actions with the third-party 612. The third-party interface system 618 is operable to communicate with a verification system fund subsystem 630 which may communicate with one or more information providers 636. Further, the third-party interface system 618 communicates with one or more third parties 612. The third-party subsystem 618 is operable to conduct actions that allow the third-party 612 to provide goods or services to a user using the verification system 600. A third-party interface system 618 can include one or more subsystems, which can include one of more of, but are not limited to, a token subsystem 620, a transfer subsystem 622, and/or a promotion subsystem 624. Each of these different subsystems will be explained in turn hereinafter.

The token subsystem 620 is operable to receive a token from the private processing switch 602. The token subsystem 620 is operable to communicate with the third-party 612 associated with the tag(s) or information in the token. Thus, the token subsystem 620 is operable to retrieve information from the database 114 associated with the token. From this information, the token subsystem 620 can identify the third-party 612 to which the token is associated. The token subsystem 620 may then communicate with the third-party 612 to determine information about the product also identified in the token. Thus, the token subsystem 620 can communicate with a product data store associated with the third-party 612 that may include one or more skew numbers or other data identifying the product or service within the token. The token subsystem 620 may then receive information, such as the price of the product or service, to then affect payment for the good or service. The token subsystem 620 can communicate the information received from the third-party 612 to the private processing switch 602 to then use in processing the order with user interface system 604.

In embodiments, the product data store associated with the third-party may be stored by another party or off-site from the third-party 612. Regardless, the token subsystem 620 can communicate with a data source either local with the third-party or operated by another party to retrieve information about the product or service associated with the token received at private processing switch 602.

Payment information received from the private processing switch 602, as compiled by the user interface system 604, may be sent to a transfer subsystem 622. The transfer subsystem 622 can push the payment to a VS fund subsystem 603. The payment information may be formatted into a protocol or data packet, as required by the information provider 636. For example, the VS fund subsystem 630 can take the payment information from the private processing switch 602 and create an ACH transfer for the third-party 612. Thus, the VS fund system 630 can push funds from the user to the third-party's information provider 636 without the third-party ever receiving account information from the user. The methods for payment by the VS transfer subsystem 603 can include sending or transferring money to the third-party's bank or UPIC using ACH, EFT or other types of systems used for electronic or other payments. The transfer system 622 can receive a confirmation of the financial payment from the PPS fund system 630 or directly from the information provider 636. This payment information may be forwarded to the private processing switch 602 to send to the user device 102.

Upon receiving confirmation of payment for the good or service, the transfer system 622 can communicate with the third-party 612 to complete the order. In embodiments, the transfer system 622 can create a purchase order that is sent to the third-party 612. The transfer subsystem 622 can also wait and confirm delivery of the good or service with the user through the private processing switch 602. Thus, the transfer subsystem 622 can maintain open orders until confirmation of delivery of the service or good is received from the user device 102. In other embodiments, the transfer system 622 may also send the confirmation of payment to the third-party 612 as part of the completion of the order. Thus, the third-party 612 may be paid before having to send goods or services and receive confirmation of the payment. Thus, the third-party 612 need not receive account information from the user as the third-party 612 was paid before having to deliver the services or goods to the user. The purchase order sent by the transfer subsystem 622 can contain various information including, but not limited to, the address to deliver service or goods, the electronic address to deliver a service or good, the fulfillment procedures as contained within the fulfillment subsystem 606, or other information needed by the third-party 612 to complete the order.

A promotion subsystem 624 can store or inquire about promotions from the third-party 612. In embodiments, the promotion subsystem 624 can maintain a list of sales data or other information that may be used in the processing of the order with the third-party 612. In other embodiments, the promotion subsystem 624 can receive any benefits for the user regarding the order placed by the user. These benefits may include points, airline miles, cash back, or other rewards that may then be transferred to the user's specific rewards section in the rewards subsystem 608.

A user authentication subsystem 626 can authenticate a user when conducting transactions with the user. The user authentication subsystem 626 can verify security data such as, usernames, passwords, personal identification number(s) (PIN), or other such data that may be stored in the user profile generated by the user profile subsystem 616 and stored in the database 114. The authentication can be through any known method or security protocol known in the art. The user authentication subsystem 626 may also have one or more different types of authentication to use with each user based on the actions requested by the user. For example, processing of a token may take a first level of authentication, but a second level of authentication may be used when the user wants to change account information or access other more highly protected information stored within the database 114. Thus, the user authentication subsystem 626 protects the user's data from unauthorized use.

A tab subsystem 628 is operable to store, retrieve, reconcile, or otherwise act on one or more tabs stored within the verification system 600. A tab, as the name indicates, can be an IOU or other type of information that represents a debt owed from a first user to a second user, or to a third-party 612. The tabs may be created by the user or by someone that the user owes money. A description of the tabs is provided in conjunction with FIGS. 3E and 3F. The tabs may be stored in the database 114 by the tab subsystem 628.

An example of a token 702 for conducting push payments is shown in FIGS. 7A through 7C. The token 702 shown in FIG. 7A through 7C may include one or more data structures. For example, the token 702 can include a third-party identity data structure 704 and a product/service data structure 706 shown separately in FIGS. 7B and 7C respectively. The data structures 702 and 706 may include one or more portions that store information. Each portion may store one or more items of information. The token 702 can include more or fewer fields then that shown in FIG. 7A, as represented by ellipses 708. Several tokens 702 may be stored or communicated by the verification system 600. The one or more tokens 702 may be stored in the database 114. Embodiments of information that may comprise the third-party identity 704 are shown in FIG. 7B.

The third-party identity 704 can include one or more of, but is not limited to, a UPIC 710, a payment account number 712, a routing number 714, unique name 716, a phone number 718, and/or payer-wise name 720. The third-party identity 704 can include more or fewer fields than those shown in FIG. 7B, as represented by ellipses 732. The UPIC 710, or universal payment identification code, can be the UPIC identifier for the third-party 612. This UPIC number may be stored as part of the token by the third-party 612.

In other embodiments, the third-party identity 704 can include the third-party account number for the third-party's information provider account 636. Further, the third-party account number 712 can be combined with the routing number 714 for the information provider 636. The third-party account number 712 and routing number 714 provide enough information to complete payment for the third-party 612. A unique name 716 can be a name created by the verification system 600 or the third-party 612 that uniquely identifies the third-party 612 from other third parties. This unique name 716 can be a globally unique identifier (GUID), an alpha numeric number, a specialized name or abbreviation, or other type of identifier that uniquely identifies the third-party 612. In other embodiments, the third-party identity 704 can be the phone number 718 for the third-party 612. The phone number 718 can be used by the verification system 600 to access other information from the database 114 to effect payment and ordering of goods or services with the token 702.

The third-party identity 704 can also include a third-party-created pair-wise name 720. The pair-wise name 720 can be an association that uniquely identifies the third-party 612. For example, the pair-wise name 720 can be a name of a type of business the third-party does that can that would uniquely identify the third-party 612. For example, if the third-party 612 is a bookstore located in a certain area code, the pair-wise name 720 could be an area code with the bookstore name, e.g., Borders 303. Thus, this pair-wise name 720 would identify that bookstore among all other bookstores in that area code. In other embodiments, the user may create the pair-wise name 720 and store that as part of the token in the database 114. Thus, the information shown in the third-party identity 704 can be information stored in the database 114 and information communicated with the token 702. If one or more of the fields in the third-party identity 704 is received, other information may be retrieved from the database 114 that may be associated with that token 702. The user device 102 can identify people using the pair-wise name 720, while some of the other information may be received from a third-party 612 in a token 702 provided by the third-party 612.

One or more fields that may be included in the product/service information 706 are shown in FIG. 7C. FIG. 7C may include more or fewer fields than those shown, as represented by ellipses 734. In embodiments, the product/service information 706 may include one or more of, but is not limited to, a stock keeping unit (SKU) number 722, a unique name of the product or service 724, a catalog number 726, price information 728, and/or fulfillment information 730. The information shown in FIG. 7C may be stored in database 114 or provided within the token 702 used by the third-party 612 for a user device 102. Thus, if one or more of the fields are identified within the token 702, then other information may be retrieved from the database 114, although that information may be shown as part of the product or service portion 706 of the token 702.

A SKU 722 may be a unique identifier for the product or service within a database of goods or services stored with the third-party 612. The SKU 722 can be a bar code or other visual information or may be a unique number or alpha numeric identifier for the good or service. This SKU information may be provided to the third-party 612 to identify the product or service associated with the token 702. A unique name 724 may be a name used by the third-party 612, in identifying the good or service in a catalog for good or services provided by the third-party 612. A catalog number 726 may be a number within a particular catalog used by the third-party 612. Thus, the catalog number 726 can include the identifier from which catalog the information comes from and also the product or service number provided within the catalog.

A price 728 may be included with the token or may be retrieved either from the database 114 or from the third-party 612. The price 728 can be a currency or a numeric value for the good or service. Currency may also be listed with the price 728 to provide the currency subsystem 614 with information about what currency should be used for payment of the good or service. Fulfillment information 730 may include information provided by the third-party 612 to be used with the information stored by the fulfillment subsystem 706 to fulfill the order associated with the token 702. This fulfillment information 730 can include payment information, address information, or other information useful for the verification system 600 to complete the order.

Figure 7D:
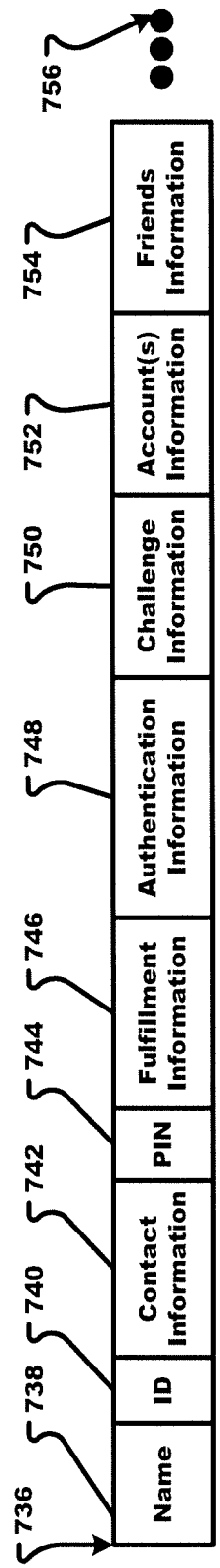
FIG. 7D is a block diagram of an embodiment of a data structure operable to store user profile information.

An embodiment of a user profile 736 is shown in FIG. 7D. The user profile 736 may be created from information received by the user or from information obtained by the VS 600. The user profile 736 may be stored in the database 114. The user profile 736 may include one or more of, but is not limited to, a name 738, an ID 740, contact information 742, PIN 744, fulfillment information 746, authentication information 748, challenge information 750, account information 752 and/or friend's information 754. In embodiments, the user profile 736 may include more or fewer fields then that shown in FIG. 7D, as represented by ellipses 756. Each of these different types of information will be described herein after.

A name 738 can include the actual name, username, or some type of identifier (ID) of the user of the verification system 600. For example, the name 738 may be a first name and last name. In other embodiments, the name 738 can include the username, employed by the user, to log into the verification system 600. An ID 740 can include an ID unique to the user that may be used in electronic communications or may be used by the user to mask their name. The ID 740 can include a social security number, a global unique identifier (GUID), or other ID, either automatically generated by the verification system 600 or created manually by the user.

Contact information 742 can include the address, phone number, e-mail address, or other information for contacting the user. This contact information 742 may be entered by the user when creating a profile 736 with the verification system 600. In other embodiments, the contact information 742 may be procured automatically by the verification system 600 in interactions with the user device 102. For example, the contact information 742 can include an e-mail address used to send information to the verification system 600, an electronic address used to communicate with the verification system 600, or other types of information that are automatically created and provided to the verification system 600.

A personal identification number (PIN) 744 can be a user generated or automatically generated number used by the user for authentication purposes or other security measures. For example, when the user logs into the verification system 600, with the user authentication subsystem 626, the user may provide the name 738 and the PIN 744 to access the information stored in the user profile or to conduct transactions with the token.

Fulfillment information 746 may be the information used by the fulfillment subsystem 606 to determine how to fulfill a transaction with the user. The fulfillment information 746 may be generated or pre-set by the user and stored within the database 114 to be used later by the transfer subsystem 722 in conducting transactions. The fulfillment information 746 can include what addresses to use for shipping addresses or which electronic addresses to use for sending electronic media, can include how to make payments to a third-party or other user, or can include other information used to conduct the transactions described herein.

Authentication information 748 may be the one or more items of information used by the user authentication subsystem 626 to determine the identity of and authenticate the user or user device 102. This authentication information 748 can include one or more of, but is not limited to, a password, a security question, or other information that may be supplement information already included in other sections of the user profile 736. For example, that authentication information 728 can include a different username for the user, which is not included in the name field 738. The authentication information 748 may be encrypted and stored within the user profile and accessed by the user authentication subsystem 626 to verify the identity of the user or user device 102.

The challenge information 750 can include one or more sets of information that can be used by the user authentication subsystem 626 for enhanced security measures. The challenge information 750 can include other information or security questions used by the user authentication system 626 to insure the user identity before allowing certain tasks. For example, if the user wishes to change the user profile 736, the fulfillment subsystem information 746, the credit subsystem and debit subsystem information, the challenge information 750 may be accessed to determine or insure the user's identity.

Account information 752 can include the one or more credit or debit accounts used by the credit subsystem 610 or the debit subsystem 612 for payment. The account information 752 can include account numbers and routing information. In other embodiments, the account information 752 can include credit card numbers, debit card numbers, or other types of payment information that may be used by the verification system 600 to obtain funds to push to a third-party 612 or to another user.

Friends information 754 can include information for people associated with the user. This friends information 754 may include one or more of, but is not limited to, friend names, friend addresses, and/or friend account information. In other embodiments, other information is also included to identify the friends. Friends information 754 can be used to create IOUs in the tab subsystem 628. The tabs are explained in conjunction with FIGS. 7E and 7F and FIGS. 8A through 8C.

An embodiment of a tab 758 as used with the tab subsystem 628 is shown in FIGS. 7E and 7F. The tab 758 can include one or more items of information, but is not limited to, a name 760, an ID 762, an IOU 764/766, a you owe me (UOME) 768/770, and/or settlement information 772. The tab 758 can have more or fewer fields than those shown in FIG. 7E or 7F, as represented by ellipses 774 and 782. The tab information creates IOUs between users. Thus, the IOU 764/766 can include information about a person either owing money to another person or the person that is owed money.

The name field 760 includes the name of the user that created the tab 758. In embodiments, the name 760 can be the person who owes money. The name 760 can be the same or similar to the name 738, as described in conjunction with FIG. 7D. As such, the name 760 can identify the user amongst all other users using the verification system 600. The ID 762 can include or be similar to the ID 740, as described in conjunction with FIG. 7D. The ID 762, therefore, also may uniquely identify the person or user that has created the tab 758 in the tab subsystem 628.

Each tab 758 may include one or more IOUs 764/766 and/or one or more UOMEs 768/770. An IOU 764/766 is a debt owed by the person identified by the name 760 and ID 762. An IOU 764/766 recognizes that that person owes money to another user. An embodiment of an IOU 764/766 is shown in conjunction with FIG. 7F. Here, an IOU 764/766 can include one or more of, but is not limited to, a tag 776, an amount 778, and/or a comment 780. The IOU 764/766 can include more or fewer fields then that shown in FIG. 7F, as represented by ellipses 782. A tag 776 can be information that identifies the person or user that is owed money. The tag 776 can include any of the information in the user profile 736, as described in conjunction with FIG. 7D. In an embodiment, the tag 776 includes the friends information 754 described in conjunction with FIG. 7D. In alternative embodiments, the tag 776 can be the same or similar to information in FIGS. 7A and 7B. Regardless, the tag 776 identifies the person that is owed money and may be used in fulfilling the tab or the IOU at a future time.

The amount 778 includes any monetary amount that may represent the debt from the user to the person who is owed money. The amount 778 can be represented in any currency as that currency may be converted by the currency subsystem 614. The comment 780 can be any comment to describe the IOU 764. The comment 780 can include why the IOU is owed or other information that allows for the settlement of the IOU at some future time. The second IOU 766 can be a second debt from the user owed to the same person or to another person. Thus, the tab information 758 can represent transactions between two people or between the user and one or more other people. The second IOU 766 can include the same information as described in FIG. 7F.

A UOME 778 can be a credit owed to the person identified in the name 760 and ID field 762. As such, the UOME 768 can include information that is sent or received from another user about a debt owed by the other user to the person. A UOME 778 can include similar information to that found in FIG. 7F but represent a credit that is owed to the person rather than a debt. The second UOME 770 can have similar information to the first you owe me 768 but may be a transaction or second credit owed to the person either from the same person or from a different person. As such, the UOME 778 represents information about any transaction where the user is owed money.

Settlement information 772 can include any information about how to settle the tabs. As such, the settlement information 772 can include information within the user profile 736 or may include other information that is described in conjunction with FIG. 7A or 7B. Settlement information 772 may be used by the tab subsystem 628 to affect payment or resolution of the tabs amongst two or more users.

Figure 8A:
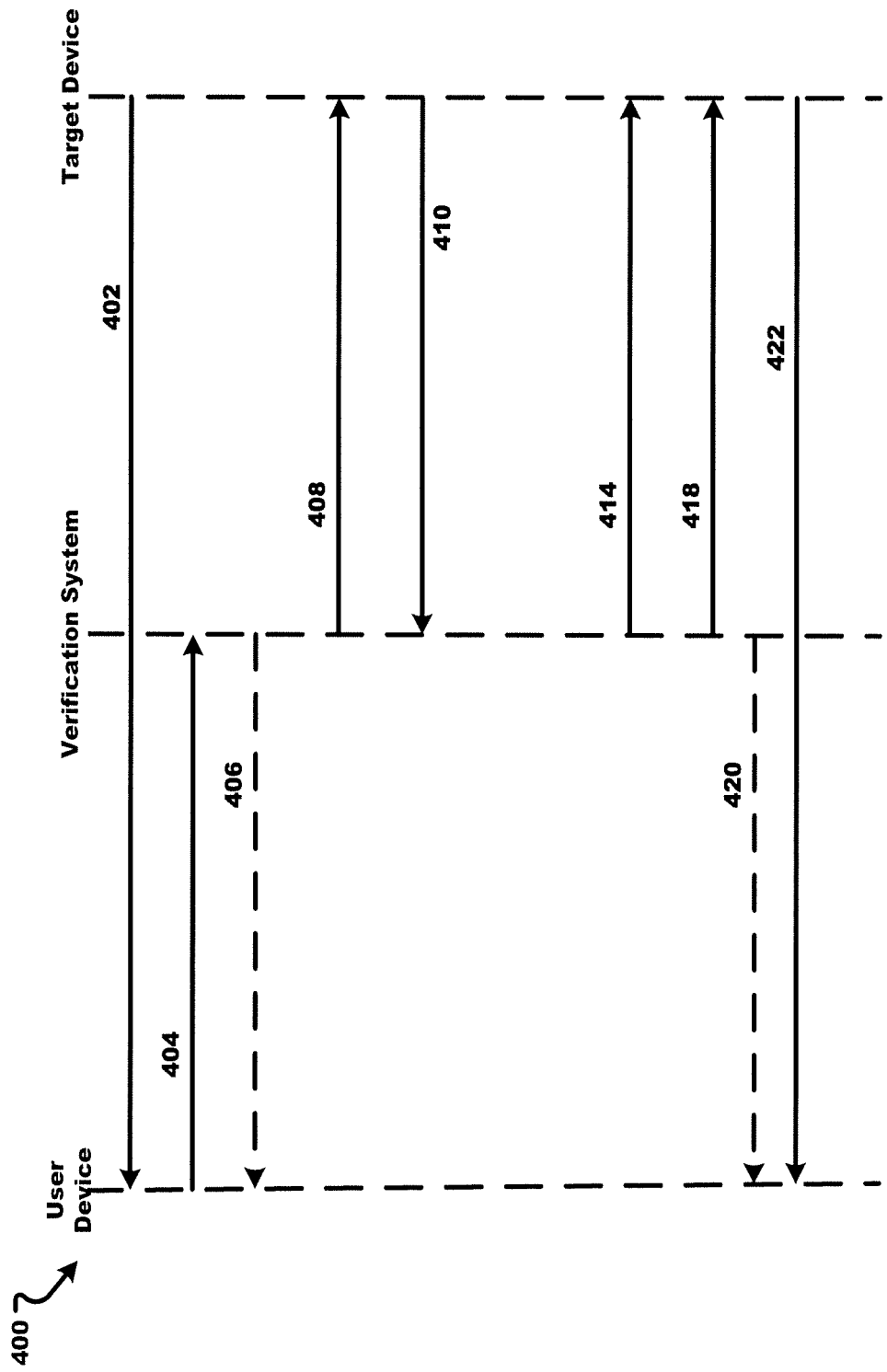
FIGS. 8A through 8D are flow diagrams of an embodiment of a process according to this disclosure.
Figure 8B:
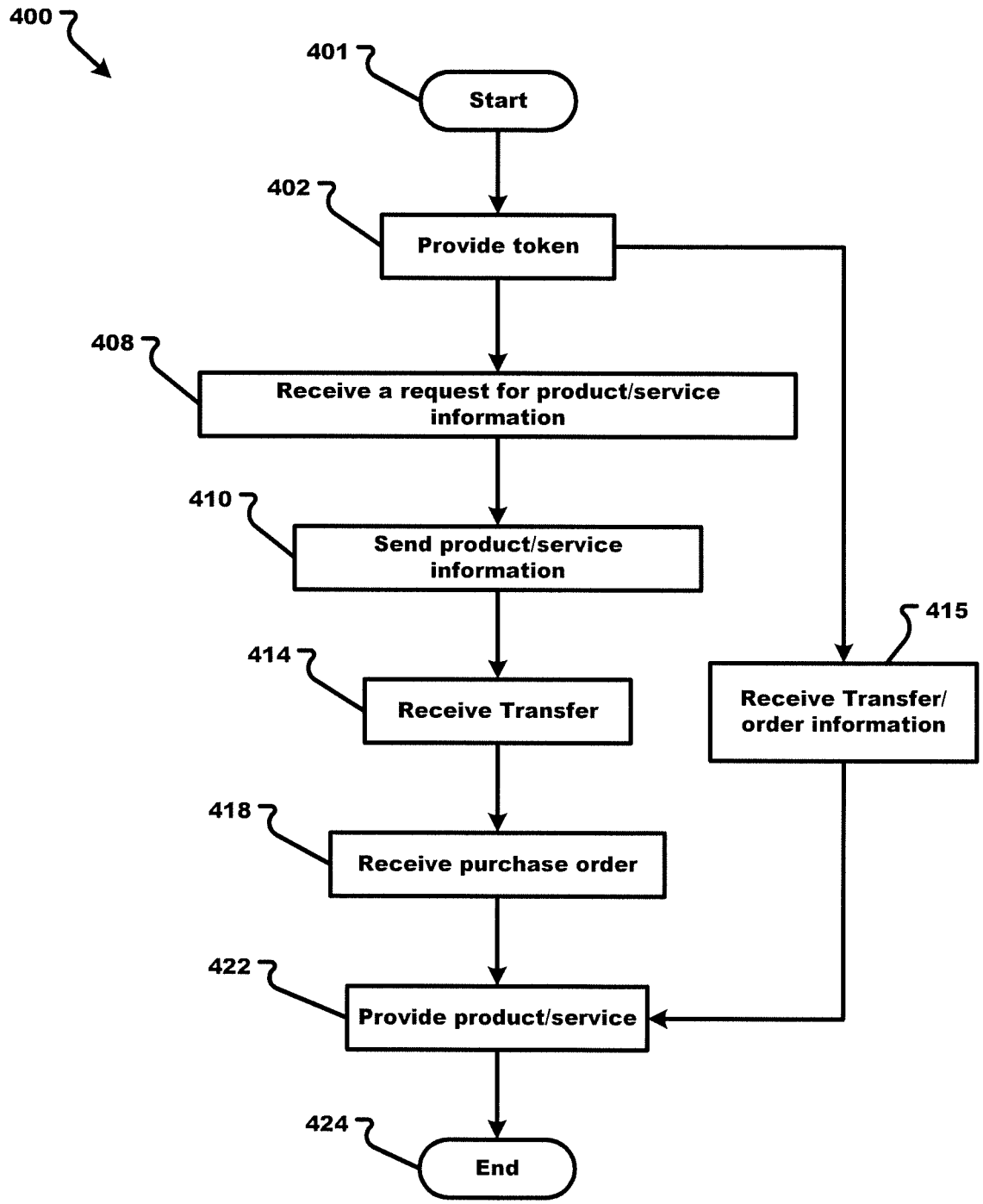
Figure 8C:
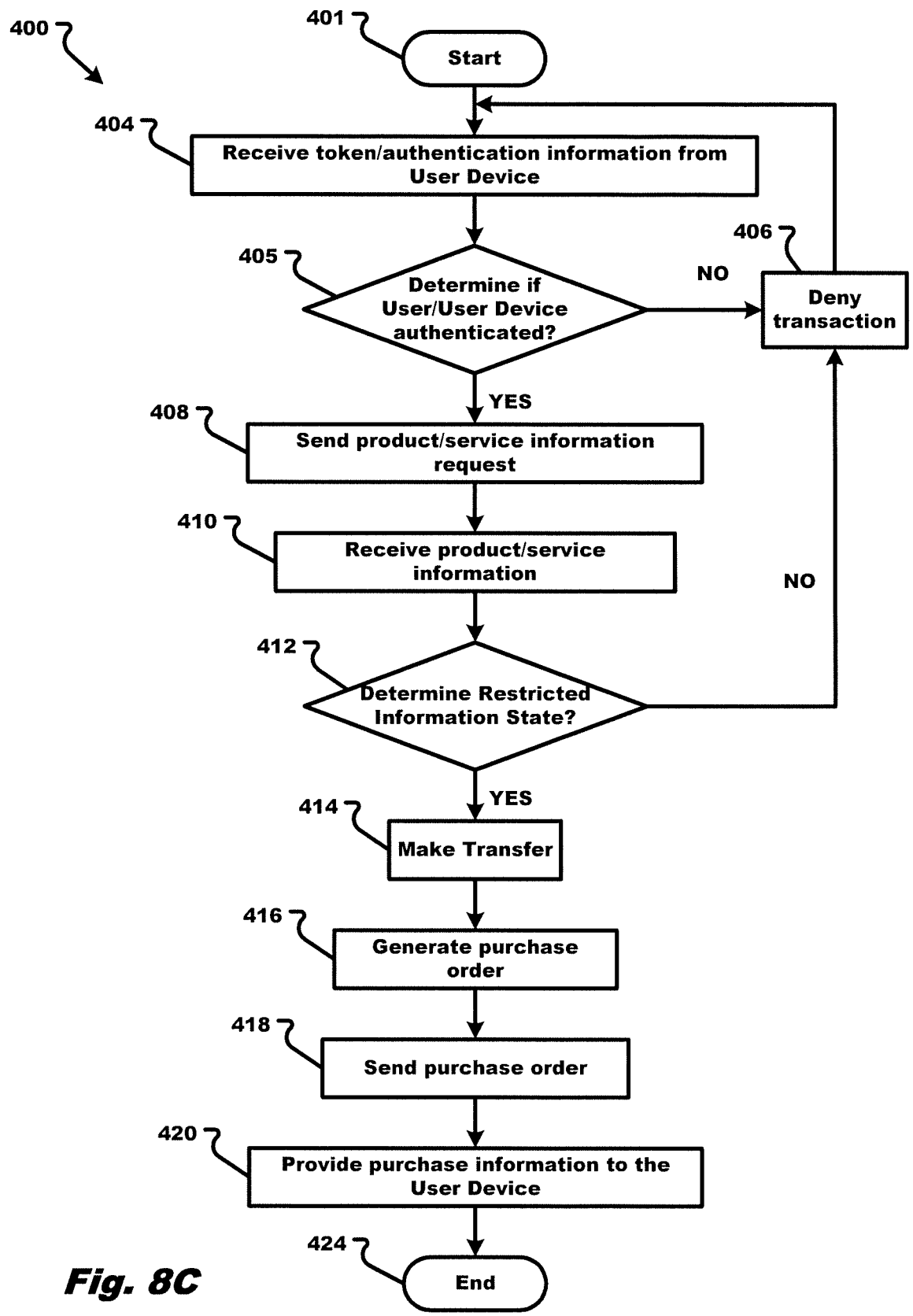
Figure 8D:
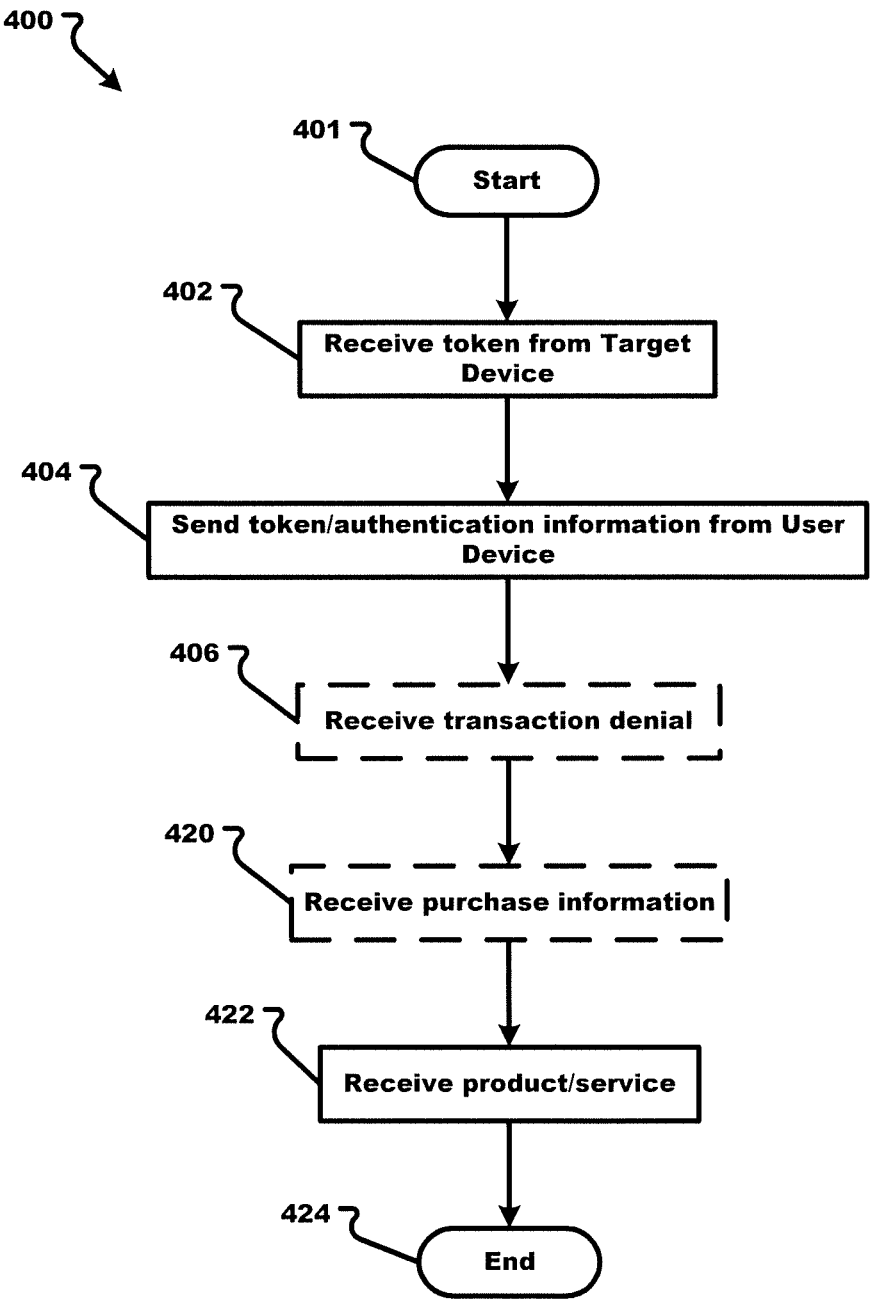

An embodiment of a method 800 for pushing payment from a user to a third-party 612 using tokens is shown in FIGS. 8A through 8D. FIG. 8B shows the method 800 from the perspective of the third-party 612. FIG. 8C shows the method 800 from the perspective of a verification system 600, and FIG. 8D shows the method 800 from the perspective of a user. Generally, the method 800 begins with a start operation 801 and terminates with an end operation 824. While a general order for the steps of the method 800 are shown in FIGS. 8A through 8D, the method 800 can include more or fewer steps or arrange the order of the steps differently than those shown in FIGS. 8A through 8D. The method 800 can be executed as a set of computer-executable instructions executed by a computer system and encoded or stored on a computer readable medium. Hereinafter, the method 800 shall be explained with reference to the systems, components, modules, data structures, user interfaces, etc. described in conjunction with FIGS. 1 and 6-7F.

A third-party 612 provides a token 702, in step 802. The third-party 612 can create or be assigned by the verification system 600 a token 702 as described in conjunction with FIGS. 7A through 7C. The token 702 may be provided in numerous ways. For example, the token 702 may be provided in a catalog and be associated with a product marketed within the catalog. In other embodiments, the third-party 612 may provide the token 702 in an advertisement within a periodical, publication, or an Internet page. The token 702 may also be associated with a service or good and may be provided to the user through other sources or methods. Regardless, the third-party sends or provides the token to the user device 102. Likewise, the user device 102 receives the token from the third-party, in step 802, to begin a transaction to push payment to the third-party to receive the product or service associated with the token.

The user device sends the token and, possibly, authentication information to the verification system 600, in step 804. Thus, the user device communicates the information within the token, such as, the third-party identity 704 and the product or service 706 associated with the token 702 to the verification system 600. In embodiments, the user enters the information into a user interface on the user device and sends the token information electronically through a network 110A and gateway 106 to the verification system 600. The token information may be received through the gateway 106 at a private processing switch 602. Recognizing the users request to purchase a service or good using the token, the private processing switch 602 can send the token to the user interface system 604.

Further, the private processing switch 602 can receive the authentication information sent, by the user device 102, and forward that user authentication information to the user authentication subsystem 626. In step 805, the user authentication subsystem 626 can determine if the user and/or user device is authenticated. Here, the user authentication subsystem 626 can check received user authentication information against authentication information 748 stored within the user profile 736. If the received authentication information, such as a user name and/or password, is authenticated, step 805 proceeds YES to step 808. However, if the user or user device is not authenticated, step 805 proceeds NO to step 806, where the user is denied the ability to conduct the transaction. As the denial of the transaction is dependent on the user not being authenticated, step 806 is optional. The user authentication subsystem 626 can send an indication, to private processing switch 602, that the user or user device is not authenticated. The private processing switch 602 then sends through, the gateway 106 and network 110, to the user device 102 a denial of the transaction. The user device can receive the transaction denial, in step 806, to be informed that the payer user will not be able to conduct the transaction because the payer user was not authenticated. It is possible that the user device can resend authentication information, because the authentication information may be entered or provided incorrectly, to retest the authentication or to reaffirm the authentication. Thus, the method flows back to step 804 after the denial of transaction. In other embodiments, the user may end a method 800 after the denial of the transaction.

In step 808, the private processing switch 602 sends the token information to the third-party interface system 618. The third-party interface system 618 can then provide the (product or service) information and third-party identity 704 to the token subsystem 602. The token subsystem 602 can create a request for (product/service) information that is sent to the third-party 612, in step 808. The request sends the (product or service) information 706 from the token 702 to the payee or third-party 612 identified in the third-party identity 704. The request asks the third-party 612 for any information necessary to purchase the product or service. This information may include price or product or service identity. In embodiments, any information necessary to fulfill a purchase order and or complete a payment transaction with a third-party's information provider 636 is requested. The request is received by the third-party 612. The third-party 612 may process the request and send the (product or service) information back to the verification system 600, in step 810. The token subsystem 620 may then provide the information for purchasing the service or good to the private processing switch 602. This information can include any financial information needed for the user interface system 604 to acquire funds to push a payment to the third-party 612.

After receiving the product or service information from the private processing switch 602, the user interface system 604 can determine if funds are available to push payment to the third-party's information provider 636, in step 812. The user profile subsystem 616 can review user information in the fulfillment information 746 and/or account information 752. This information indicates how the user desires to pay for the service or good that is associated with the token. This information is then used by the user interface system 604 to determine the state of the restricted information (e.g., either check if funds are available with the credit subsystem 2610 or the debit subsystem 612). For example, if the user has decided to use a credit transaction, the credit subsystem 610 determines if there is currently enough credit to pay for the product or service. In other embodiments, if there is an account associated with the user, the debit subsystem 612 determines if the account has enough funds to pay for the product or service associated with the token. In embodiments, the information received from the token subsystem 620 may include a currency that is different than that used with the user interface system 604. In embodiments, the currency subsystem 614 can convert the currency received with the financial information into a currency used by the credit subsystem 610 or debit subsystem 612. Upon determining if the account associated with the credit subsystem 610 or the debit subsystem 612 has enough funds to pay for the product or service, the user interface system 604 sends either an approval or a denial of the transaction to the private processing switch 602. If the user interface system 604 determines the funds are not available, step 812 proceeds NO to step 806 where the transaction is again denied. However, if funds are available, step 812 proceeds YES to step 814.

The verification system 600 makes the funds transfer or sends payment to the third-party 612, in step 814. Here, the user interface system 604 sends or provides payment information to the private processing switch 602. For example, the user interface system 604 can send the information about the funds to the private processing switch 602, which forward the transfer or payment information to the transfer subsystem 622. The transfer subsystem 622 then pushes a payment through the verification fund subsystem 632 to the third-party's information provider 636. The payment may be sent through an ACH or EFT transaction. As such, the verification system 600 pushes the funds to the information provider 636 without any account information of the user being presented to the third-party 612 or the third-party's information provider 636. Upon completion of the payment, the information provider may provide back, to the verification system 600, an indication of whether the funds were properly transferred and payment has been received. This payment information is provided through the VS fund subsystem 630 back to the transfer subsystem 622. The transfer subsystem 622 then provides the payment information to the private processing switch 602, which may forward this information to the user interface system 604.

Upon receiving the confirmation that the payment is received, the transfer subsystem 622 can generate a purchase order, in step 816. The purchase order can include any information necessary for the third-party 612 to complete the transaction or provide the service or good to the user. The purchase order can include the payment confirmation and any of the other information associated within the token or associated with the user or token 702 that the third-party 612 may need. Upon completing the generation of the purchase order, the transfer subsystem 622 sends the purchase order to the third-party 612, in step 818. The third-party receives the purchase order, in step 818, and begins the process of providing the service or good to the user. Thus, to complete the purchase order, the third-party 612 provides the user the product or service, in step 822. In embodiments, the transfer system 622 includes any information from the fulfillment subsystem 606 stored in the fulfillment information 746 on the user profile 736. This fulfillment information can include any information needed by the third-party 612 to send the product or service to the user. For example, the fulfillment information may include an electronic address to send a software application for the user. Thus all transaction details are completed and the third-party 612 can provide the product or service to the user knowing that payment has been completed. With this system, the user and third-party 612 can complete a transaction without ever exchanging financial information. The user can receive the product or service, in step 822. In embodiments, the user may also receive the transfer or purchase information as sent from the verification system 600 to the information provider 636, in step 820. Thus, the user receives any information about the transaction and the product or service.

Figure 9A:
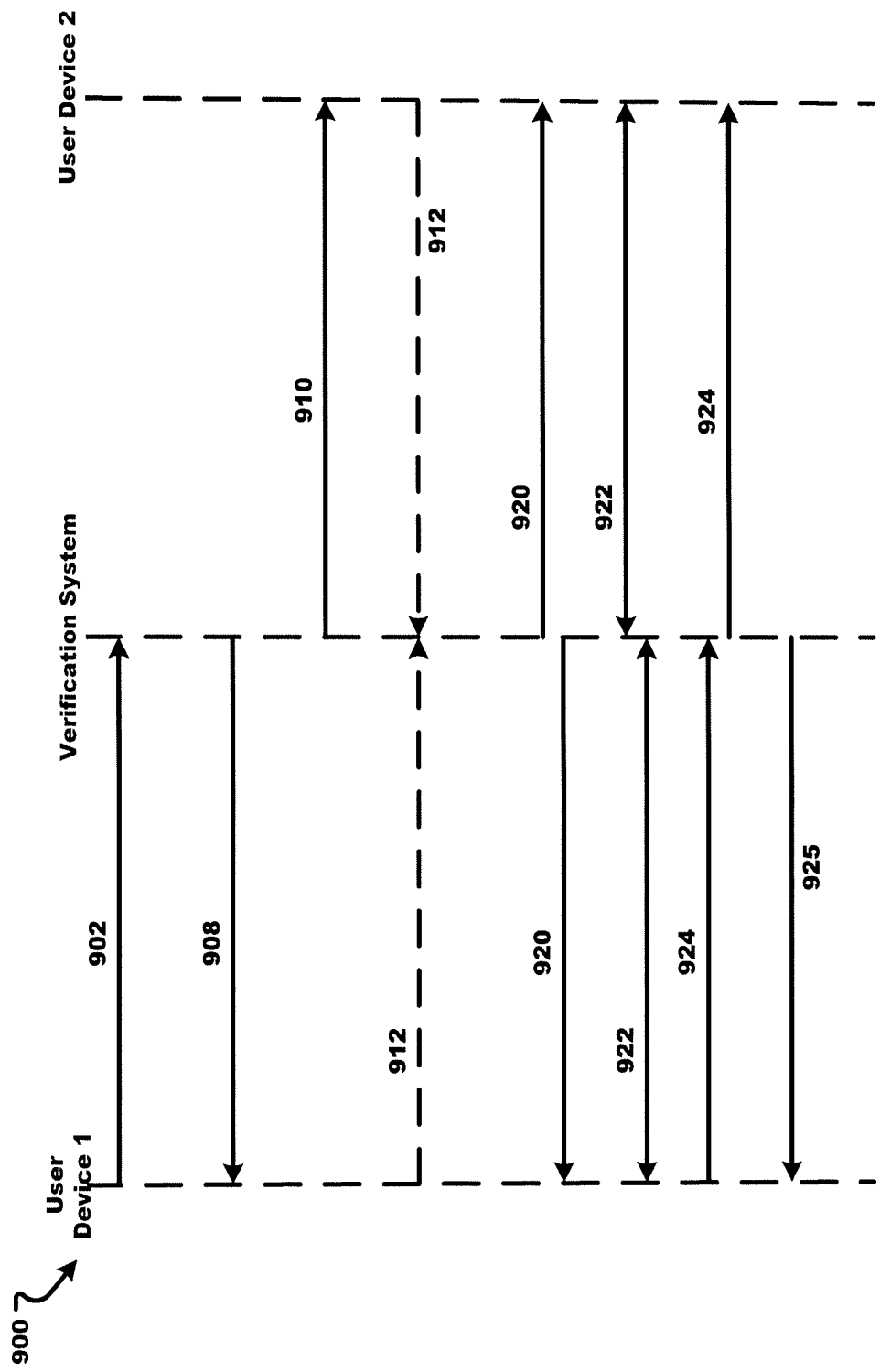
FIGS. 9A through 9C are flow diagrams of an embodiment of a process according to this disclosure.
Figure 9B:
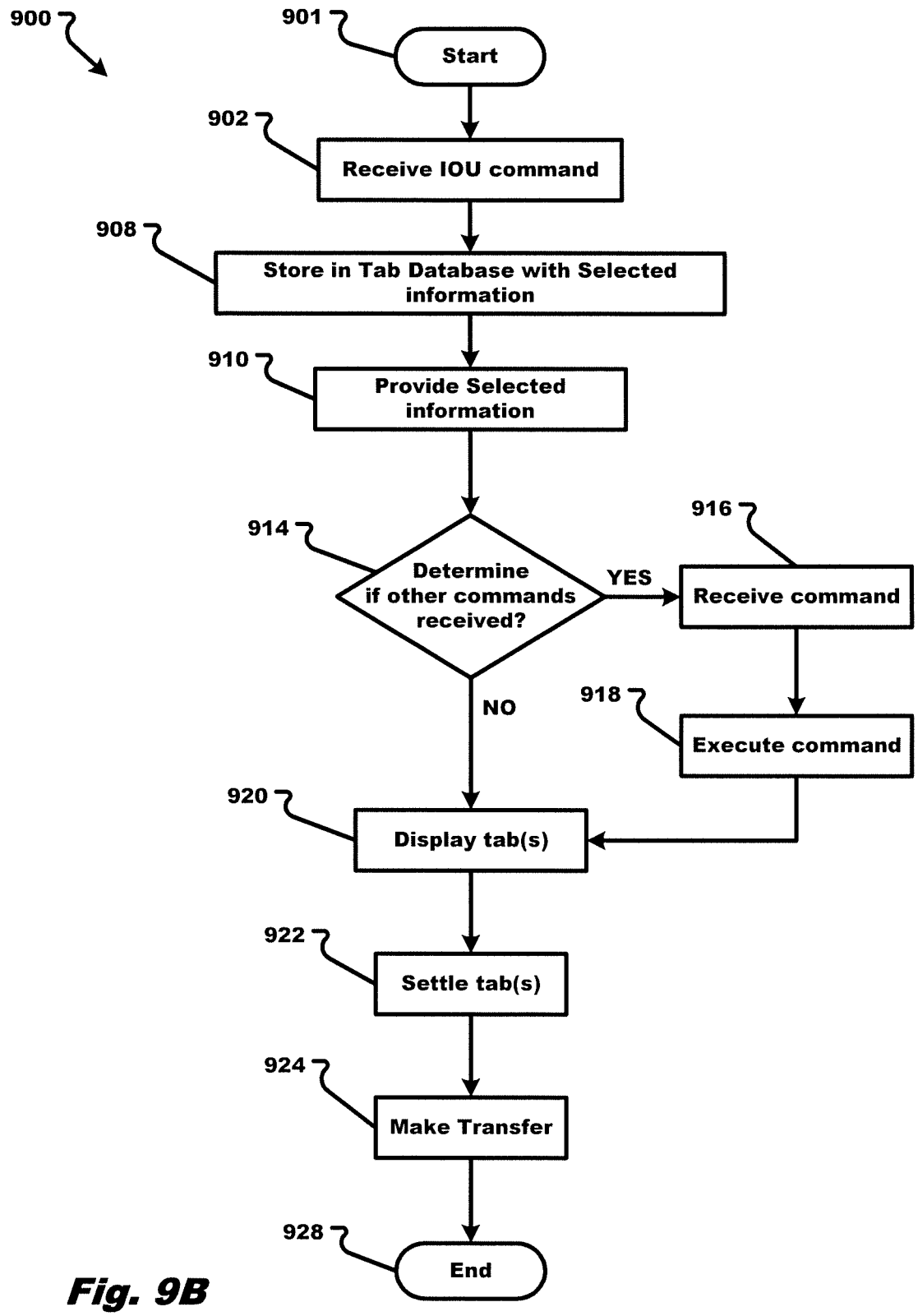
Figure 9C:
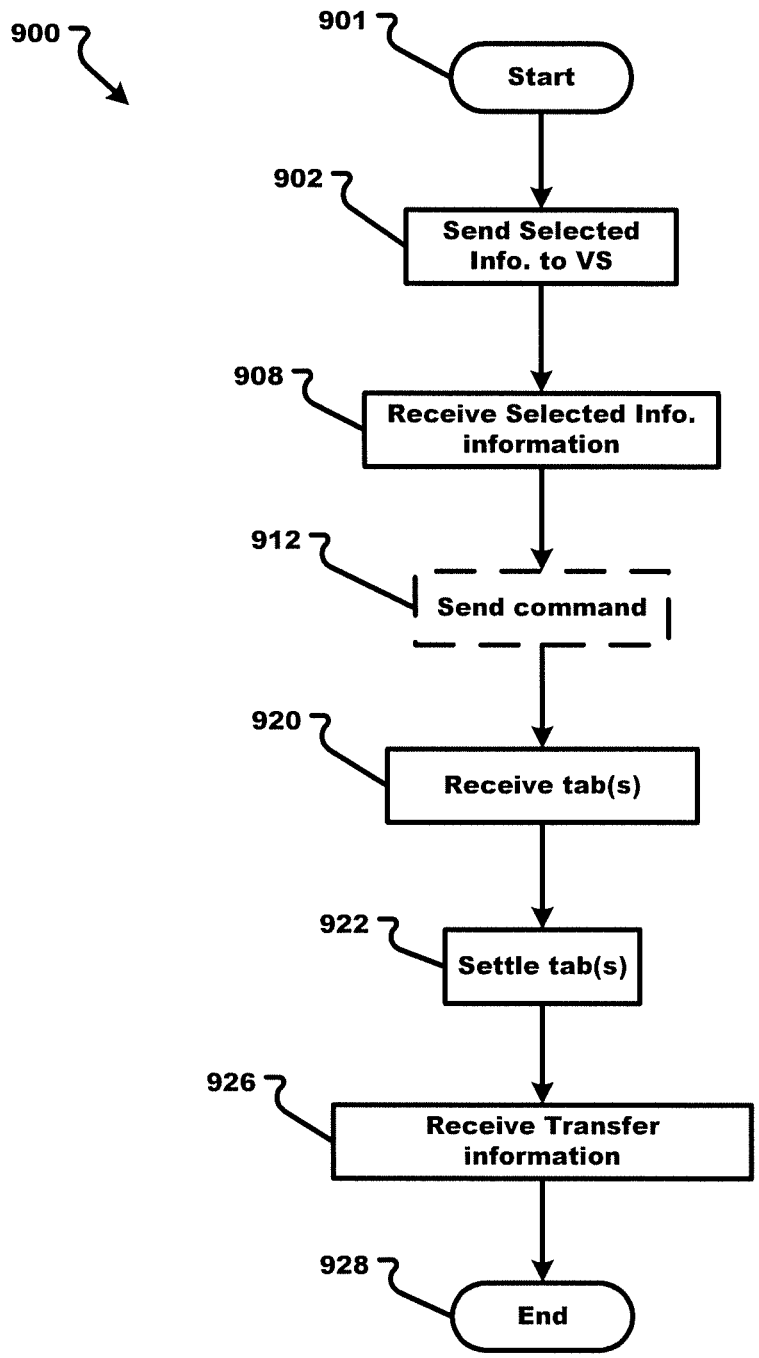

An embodiment of a method 900 for creating tabs with the verification system 600 is shown in FIGS. 9A through 9C. A tab can be selected information, such as an IOU or you owe me associated between two users. Thus, the verification system 600 provides a method for creating credits or debits between users without the users exchanging financial information. In embodiments, FIG. 9B represents a perspective of the verification system 600 that organizes the IOUs. In contrast, FIG. 9C represents the perspective of at least one user device 102 creating or receiving selected (IOU) information. Generally, the method 900 begins with a start operation 902 and terminates with an end operation 928. While a general order for the steps of the method 900 are shown in FIG. 9, the method 900 can include more or fewer steps or the order of the steps may be arranged differently than the method 900 shown in FIG. 9. The method 900 can be a set of computer-executable instructions executed by a computer system or processor and/or encoded or stored on a computer readable medium. Hereinafter, the method 900 shall be explained with reference to the systems, components, modules, data structures, user interfaces, etc. described in conjunction with FIGS. 1 and 6-7F.

A user can create an IOU by interfacing with the verification system 600 through the user device 102. Thus, the user may access a web service or other computer-associated user interface to create an IOU to send to the private processing switch 602. The user device then sends the information about the IOU to the private processing switch 602, in step 902. The private processing switch 602 receives the selected (IOU) command and selected (IOU) information, in step 902. The private processing switch 602 forwards this selected information to the tab subsystem 628. The tab system 628 creates a tab 758 and stores that tab in the database 114, in step 908. The tab can include one or more of the fields as described in conjunction with FIGS. 7E through 7F. This selected (IOU) information is stored in a tab database associated with the user. Upon storing the tab, the tab subsystem 628 can provide the information back to the private processing switch 602 that can communicate the IOU to the first and second user, in step 910. Thus, the private processing switch 602 can send the selected (IOU) information as created by the first user, and send that information to the user through the gateway 106 network 110. The first user can receive the selected (IOU) information to determine if the IOU was correctly created. Further, the private processing switch 602 can send the selected (IOU) information to the second user. The IOU information sent to the second user can appear as a UOME in the tabs database.

The private processing switch 602 may then receive one or more commands from either the first or second user, in step 912. Thus, the first or second user may send a command to affect an action with the tab. The commands can conduct operations regarding the tab subsystem or create new tabs. The private processing switch determines if other commands are received, in step 914. If further commands are received, step 914 proceeds from YES to step 916. If no other commands are received, step 914 proceeds NO to step 920. In step 916, the private processing switch 602 receives the other commands. The private processing switch 602 may then send the command to the tab subsystem 628, which executes the command, in step 918. Examples of the commands that may be received are provided herein after.

An "I owe you" command (IO) can create a tab IOU 764. An IO command can include a "tag" 776, an "amount" 778, and a "comment" 780. The "tag" 776, an "amount" 778, and a "comment" 780 may be as described in conjunction with FIG. 7F. An example of an IO command is: IO Dave 10. With this IO command, the sender is informing the VS 600 and Dave that the sender owes Dave $10. The tab subsystem 628 opens a tab and notifies Dave and the sender that a tab has been opened and provides a transaction number.

A "You Owe Me" command (UO) can create an OME 768. When a UO command is sent to VS 600, the tab subsystem 628 can create a UOME tab having similar fields to the IOU, e.g., "tag" 776, an "amount" 778, and a "comment" 780. The "tag" 776, an "amount" 778, and a "comment" 780 may be as described in conjunction with FIG. 7F. An example of such a UO command is: UO Dave 10. With this UO command, the sender is informing the tab subsystem 628 and Dave that Dave owes the sender $10. The tab subsystem 628 opens a tab and notifies Dave and the sender that a tab has been opened and provides a transaction number.

A "reject" command (RJCT) is used to reject a transaction (either an IO or UO). When the RJCT "tag" or RJCT "transaction" is sent, the "tag" identifies the individual whose transaction the sender wishes to reject and "transaction number" identifies the specific transaction (for example, see IO and UO above). In an example, a RJCT dave tr3 (where tr3 is the transaction number), the tab subsystem 628 identifies the transaction, by first identifying the correct tab, which is indexed by the sender's handle (which might be the mobile number or some other tag), and Dave's handle (once again, mobile number or some other tag). Within this tab, TR3 identifies the transaction in question and thus the amount in question. With this information, the tab subsystem 628 can remove or adjust the tab and then will notify both parties of the change.

The tab command (AB) can be sent by a user to display currently open or unsettled tabs. For example, sending TAB to the VS 600 will return the following if open tabs: Dave owes you $10; Jim owes you $100; You owe Sue $30, etc. If there are no open tabs, then the tab subsystem 628 responds by saying that there are no open tabs. If the TAB command is sent with a tag, then the tab subsystem 628 returns the transactions associated with the individual identified in the tag. For example, if the sender has an open tab with Dave, then sending the TAB Dave returns: TR1 You owe Dave—$10; TR2 Dave owes you—$20; TR3 Dave owes you—$40 ** rejected; Net—Dave owes you $10.

The settle command (STL) is the command for settling a tab. Sending STL tag, where tag is the designation of the individual with whom the sender wishes settle, instructs the tab subsystem 628 that the user wishes to have the tab with the identified person settled. For example, sending the STL Dave command to the VS 600, the tab subsystem 628 determines the balance of tabs with Dave, if any, and sends an invitation to the party that owes the funds to initiate payment. In this case, Dave would get a message saying the he owes the sender of the settle command $10. If there is no tab open, then the tab subsystem 628 sends the sender a message and invites the sender to use the tab command to identify open tabs. The tab subsystem 628 will remind Dave periodically if the payment associated with this tab is not paid. After some number of days, the sender has the option to "forgive" the tab, which will result in the tab subsystem 628 not sending any additional reminders.

The PAY command would be used to pay another individual a certain amount. Sending the PAY command can be formatted with a "tag," and "amount," and a "PIN," where tag and amount are as described with the IOU and the PIN is a password or personal identification number setup by the sender ahead of time.

A block command (BLK) can be used to block all transactions from a certain mobile number or other user. The format of the command is BLK "tag," where the tag may be the number of the mobile number to block.

An unblock command will allow transactions from a previously blocked the mobile number.

A balance command (BAL) can be used to check the balance in an account. The format for the BAL command is BAL, "PIN," where PIN is the password or personal Identification number discussed earlier.

A gift command is for sending a gift to another user. The format for this command is gift, "tag," "optional message," "optional destination," where tag is the recipient, the message (which is optional) contains a greeting (have a nice day, happy birthday etc.), and destination designates where the funds are to go. For example, the tag or receiver may have setup a prepaid card or gift card from a third-party (e.g. Starbucks) and the sender may wish to buy the recipient (tag) a cup of coffee from Starbucks. Without a destination, the tab subsystem 228 credits the receiver's account with the cash.

After all commands and IOUs are created, the tab subsystem 628 can display the tabs, in step 920. To display the tabs, the tab subsystem 628 can create a user-centric view of the IOUs or UOMEs associated with the user. Thus, any information regarding the IOUs or UOMEs may be created and provided in a user interface to the user, such that, the user can view IOUs or UOMEs by who the debt is owed or by who owes the UOMEs. The user may view this information or see the tabs, in step 920. Upon receiving the tabs, or at some point thereinafter, the user may decide to pay for the debts or receive money for the credits.

The user can settle tabs, in step 922. In settling a tab, the user pays for any IOUs or requests payment for any UOMEs. The settlement may be sent to the private processing switch 602, which is forwarded to the tab subsystem 628. Depending on how the user decides to settle the IOUs and UOMEs, the tab subsystem 628 may calculate or resolve the debts and credits internally. For example, any credits owed by one party may be used to balance any debts owed to that party. Thus, the total amount, which is a balance of all credits and debts, may be established by the tab subsystem 628. Upon determining whether an amount is owed to another party or another party owes the user, the tab subsystem 628 may forward this information, through the private processing switch 602, to the user interface system 600, in step 922. The user interface system may then request payment or make a payment through the credit subsystem or debit subsystem to another user. Thus, transfer or payment may be sent, in step 924, by the user interface system 604 to another user's information provider or to the user's accounts within the verification system 600. As such, the user can push payment to another user without exchanging any financial information with that user. Upon completing payment for the tabs, the user interface system may generate payment information, which may be sent through the private processing switch 602 to the user, in step 926. Upon receiving payment information the user has completed the settlement of the tabs.

FIG. 10 illustrates a block diagram of a computing environment 1000 that may function as system or environment for the embodiments described herein. The system 1000 includes one or more user computers 1005, 1010, and 1015. The user computers 1005, 1010, and 1015 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 1005, 1010, 1015 may also have any of a variety of applications, including for example, database client and/or server applications, and web browser applications. Alternatively, the user computers 1005, 1010, and 1015 may be any other electronic device, such as a thin-client computer, Internet-enabled mobile telephone, and/or personal digital assistant, capable of communicating via a network (e.g., the network 1020 described below) and/or displaying and navigating web pages or other types of electronic documents. Although the exemplary system 1000 is shown with three user computers, any number of user computers may be supported.

System 1000 further includes a network 1020. The network 1020 can be any type of network familiar to those skilled in the art that can support data communications using any of a variety of commercially-available protocols, including, without limitation, TCP/IP, SNA, IPX, AppleTalk, and the like. Merely by way of example, the network 1020 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 1000 may also include one or more server computers 1025, 1030. One server may be a web server 1025, which may be used to process requests for web pages or other electronic documents from user computers 1005, 1010, and 1015. The web server can be running an operating system including any of those discussed above, as well as any commercially-available server operating systems. The web server 1025 can also run a variety of server applications, including HTTP servers, FTP servers, CGI servers, database servers, Java servers, and the like. In some instances, the web server 1025 may publish operations available operations as one or more web services.

The system 1000 may also include one or more file and or/application servers 1030, which can, in addition to an operating system, include one or more applications accessible by a client running on one or more of the user computers 1005, 1010, 1015. The server(s) 1030 may be one or more general purpose computers capable of executing programs or scripts in response to the user computers 1005, 1010 and 1015. As one example, the server may execute one or more web applications. The web application may be implemented as one or more scripts or programs written in any programming language, such as Java™, C, C#™ or C++, and/or any scripting language, such as Perl, Python, MySQL, or TCL, as well as combinations of any programming/scripting languages. The application server(s) 1030 may also include database servers, including without limitation those commercially available from Oracle, Microsoft, Sybase™, IBM™ and the like, which can process requests from database clients running on a user computer 1005.

The web pages created by the web application server 1030 may be forwarded to a user computer 1005 via a web server 1025. Similarly, the web server 1025 may be able to receive web page requests, web services invocations, and/or input data from a user computer 1005 and can forward the web page requests and/or input data to the web application server 1030. In further embodiments, the server 1030 may function as a file server. Although for ease of description, FIG. 10 illustrates a separate web server 1025 and file/application server 1030, those skilled in the art will recognize that the functions described with respect to servers 1025, 1030 may be performed by a single server and/or a plurality of specialized servers, depending on implementation-specific needs and parameters. The computer systems 1005, 1010, and 1015, file server 1025 and/or application server 1030 may function as servers or other systems described herein.

The system 1000 may also include a database 1035. The database 1035 may reside in a variety of locations. By way of example, database 1035 may reside on a storage medium local to (and/or resident in) one or more of the computers 1005, 1010, 1015, 1025, 1030. Alternatively, it may be remote from any or all of the computers 1005, 1010, 1015, 1025, 1030, and in communication (e.g., via the network 1020) with one or more of these. In a particular set of embodiments, the database 1035 may reside in a storage-area network ("SAN") familiar to those skilled in the art. Similarly, any necessary files for performing the functions attributed to the computers 1005, 1010, 1015, 1025, 1030 may be stored locally on the respective computer and/or remotely, as appropriate. In one set of embodiments, the database 1035 may be a relational database, such as Oracle 10i™, that is adapted to store, update, and retrieve data in response to SQL-formatted commands. Database 1035 may be the same or similar to the database used herein.

FIG. 11 illustrates one embodiment of a computer system 1100 upon which servers or other systems described herein may be deployed or executed. The computer system 1100 is shown comprising hardware elements that may be electrically coupled via a bus 1155. The hardware elements may include one or more central processing units (CPUs) 1105; one or more input devices 1110 (e.g., a mouse, a keyboard, etc.); and one or more output devices 1115 (e.g., a display device, a printer, etc.). The computer system 1100 may also include one or more storage device 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125; a communications system 1130 (e.g., a modem, a network card (wireless or wired), an infra-red communication device, etc.); and working memory 1140, which may include RAM and ROM devices as described above. In some embodiments, the computer system 1100 may also include a processing acceleration unit 1135, which can include a DSP, a special-purpose processor and/or the like.

The computer-readable storage media reader 1125 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 1100 may also comprise software elements, shown as being currently located within a working memory 1140, including an operating system 1145 and/or other code 1150, such as program code implementing the servers or devices described herein. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

There are several examples where the VS 600 can be used for transactions. In an example, a concert promoter or even the band or orchestra can sign-up with VS 600 to make their performance or recordings available to members in the audience who are also users of VS 600. The producer of the show or even the band or orchestra is assigned a third-party code when they sign up with VS 600. They can also assign SKU numbers to their products (live music as well as pre-recorded). The combination of the third-party code and SKU number will now constitute the token. An audience member, during the show, can use their mobile device to place an order for music (either the live version or pre-recorded) by using the appropriate token for the particular piece of music. The VS 600 will process the transaction and deliver the music to their email address or even mobile device.

In another example, a charitable or non-profit organization can sign-up for a third-party/organization code and an event code that can both be advertised to the public. Users of VS 600 can then make charitable donations to these organizations without disclosing payment information. For example, a pledge drive, by a public TV or radio station, can be advertised by announcing the VS 600 token in addition to traditional payment methods. A VS 600 user can then "push" a payment to that organization without disclosing that user's payment information. A charitable organization wishing to raise funds to help the needy after a catastrophe can advertise their organization code along with an event code that is tied to that particular catastrophe thereby allowing users of VS 600 to donate impulsively and without compromising or disclosing their payment information. Examples of such organizations might include National Public Radio, the Redcross, various churches, temples, political organizations, etc.

In another example, a political campaign could sign-up for a token with VS 600 that could be advertised at a rally (political, religious etc.). Audience members, who are members of VS 600, can donate funds to that token without ever disclosing their payment information.

In another example, a radio or TV channel (station) could sign-up for a third-party token and setup a SKU number for their products. For example, a shopping network can sign-up, with the VS 600, for a third-party code and utilize their existing product numbers to create the token. A music TV station can also sign-up for a third-party code and assign a SKU number to the music videos that they play. A radio station can sign-up for a third-party code and setup a SKU number for each piece of music that they play. A VS 600 user who listens to that radio station or views that channel can use VS 600 to purchase that product, music or video just by using the assigned tokens but without disclosing their payment information.

In another example, an internet third-party can sign-up for a VS 600 third-party code. When a VS 600 user is ready to pay for purchases, he or she can select VS 600 as one of the payment options. The third-party's system notifies VS 600 of the purchase amount and other information, including SKU numbers for products in the user's shopping cart, and VS 600 generates a one-time only invoice number and sends it to the third-party. The user then uses the third-party number and this one-time invoice number as the tokens and makes the payment via VS 600 without disclosing the user's payment information to the third-party thereby reducing if not eliminating the threat of identity theft.

A brick-and-mortar third-party would also VS 600 the very same way. A third-party would sign-up for a VS 600 third-party code. At check-out time, the final settlement amount and invoice are electronically transmitted to VS 600 which in turn generates a token that is sent to the POS terminal. The cashier provides the token to the user who then facilitates a payment by sending the token to VS 600. Upon reception of the token, VS 600 authenticates the users and issues either a payment or credit to the third-party and notifies that POS terminal. Once again, the user's information is not disclosed to the cashier.

In another example, a visitor to a store could identify an item of interest and make an electronic purchase as follows (i.e. not use the store's point of sale or cashier): The payer user sends product SKU or name or some other product description along with the third-party code to VS 600 and VS 600 can facilitate not only the purchase but also delivery of that item to the payer user's home or to someone else (in the network as described below). Such a capability allows the payer user the ability to avoid waiting in line at the cashier and perhaps even dealing with taking possession of large and cumbersome items. Of course, the purchaser may also send the product description to a competing retailer or even a comparative shopping site and make a purchase from the competing retailer.

In another example, a publisher can sign-up with VS 600 to facilitate rapid and spontaneous purchase of the publisher's products. Such a purchase maybe facilitated during promotional events that are hosted on television (shows such as the Oprah Winfrey show), newspaper advertisements as well as radio events, internet events and even mobile phone events.

In another example, a network marketing company can sign-up with VS 600 to allow their payer users to rapidly and spontaneously make purchases from catalogs as well as purchase events held at the homes of sellers of such products.

In one example, a group of individuals might go for a night out, a picnic, a weekend ski trip, a trip to the beach or some other activity. As is often the case, different individuals pay for different products or services (e.g. one individual pays for the cabin, another buys all the ski lift tickets, another rents the cars or van and another might pay for show tickets). Often, these expenses are tallied at the end of the trip and settled using cash or check. VS 600 provides a capability for individuals to open and maintain tabs between individuals, populate the tabs using "I owe you" and "you owe me" commands, settle the tab (calculate who owe how much and to whom) and then push payments to the appropriate individuals.

In another example, a group of individuals might like to go together to a sporting event, a concert, a movie, a play etc. One individual might purchase the tickets for the whole group and collect payment from the other individuals in the group. In this case, VS 600 can be used by the payer user to open a tab with each individual in the group where the payer user sends "you owe me" commands to the others through VS 600 or by the others sending "I owe you" commands or a combination of both. The individuals can then use VS 600 to settle the "tab" at an appropriate time and pay the owed amounts.

Similarly, in another example, a group of parents might wish to purchase a thank-you gift for a teacher. Once again, one individual can purchase the gift on behalf of all the parents and then use VS 600 to settle payment.

The disclosure is not limited to financial transactions involving products or services but can apply to the exchange of any type of proprietary, confidential, sensitive, and/or protected information, such as account information, voucher information, coupons, gift certificates, and other benefits and entitlements, user authentication and/or verification information, and the like. Proprietary, confidential, sensitive, and/or protected information is commonly not stored by first and third parties or their respective computational devices engaging in a transaction involving the exchange of money, products, services, and/or other items of value (such as certain types of information but is handled securely by an independent and trusted information provider. In one configuration, one or more identifiers (e.g., third-party identifier, identifier of computational device of third-party (e.g., electronic address or other identifier of the computational device), and/or electronic session identifier (including web, mobile device, tablet, etc.)) is/are assigned and transmitted, by a computational device of the verification system (e.g., a service entity ("VS") connected with the information provider), to a computational device of the third-party (e.g., merchant); the identifier(s), at the time of the transaction or exchange, and other pertinent information, such as the amount for a purchase or sale, are provided, to the first party, directly by the third-party to the first party (e.g. customer or payer user) and/or electronically by a computational device of the third-party to a computational device of the first party; the first party, via his or her computational device, provides the identifier(s) and other pertinent information (including an additional second party identifier assigned to the third-party and/or its computational device by the verification system, answers to one or more predetermined questions for first party authentication, etc.) to a computational device of the verification system, which authenticates the first party, the first party device, and transaction; the verification system provides notification of successful authentication and transaction information to the information provider system; the information provider authorizes the exchange, such as based on proprietary, confidential, sensitive, and/or protected information (e.g., available account identifier and balance of first party and authorization and/or successful authentication of first party or the first party computational device) maintained at the verification system; and the information provider system, via its computational device, authorizes the transaction (e.g., provides to the computational device of the third-party approval uniquely identifying the first party, its computational device, and/or the electronic session, said approval appearing on a display of the third-party's computational device),including concurrent or subsequent disbursement of any funds required by the third-party. The first party is free to take the goods and/or receive services or other item(s) of value that are the subject of the transaction. This can enable secure debit or credit transactions, such as using a credit or debit card via a credit or debit card issuer.

In one example, the VS is used in a voucher-based system. A voucher company collects funds from an employer or third-party and provides them with digital or electronic vouchers. An employee or payer user receives digital or electronic vouchers from the third-party or employer. The payer user might need to pay for the voucher or, in the case of the employee, the voucher might be provided by the employer at no or little charge. The employee or payer user makes a purchase at a retail outlet desiring to pay for the merchandise wholly or partially with one or more vouchers. The third-party provides its recipient identifier and other information as set forth herein to the user of the employee or payer user. The user provides the identifier and other information to the VS. VS, after authentication of the employee or payer user, user, and third-party provides the transaction details (e.g., transaction amount and other information set forth herein) to the voucher company for authorization. When authorization is received, the VS sends notification of the authorization to the third-party. The employee or payer user can then take the purchased goods or services, and the voucher company and third-party thereafter settle the transaction. Vouchers can remain with the voucher company and/or employer, are allocated to the employee or payer user but not provided to them, and not given to third parties. Accordingly, the VS can reduce, or eliminate altogether, voucher misuse, tamper, re-sale, etc. Vouchers can be redeemed only at authorized third parties and cannot be stolen. The voucher company can be assured that only authorized users can access and use vouchers, thereby reducing counterfeit risk and fraud risk.

Any of the steps, functions, and operations discussed herein can be performed continuously and automatically.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A method, comprising:
   generating, by a verification system processor, a token comprising a set of recipient data structures and a set of restricted information identifier data structures, the set of recipient data structures comprising a unique recipient identifier of a target device receiving restricted information and the set of restricted information identifier data structures identifying the restricted information to be provided to the target device, wherein the unique recipient identifier of the target device comprises a random or pseudo-random sequence of numbers or symbols generated by the verification system processor using a random or pseudo-random number generator and a seed, the seed comprising one or more of an electronic address or physical location associated with the target device, the unique recipient identifier of the target device, a session identifier of a session involving the target device, and a random number identifier;
   providing, by the verification system processor, the token to a third party system associated with the target device;
   receiving, by the verification system processor from a user device associated with a user and as part of an electronic session and transaction, a user identifier and the token, wherein the token comprises the unique recipient identifier of the target device;
   authenticating, by the verification system processor, the user identifier, as part of the transaction, to verify the user and/or user device;
   authenticating, by the verification system processor, the unique recipient identifier comprised in the token received from the user device, as part of the transaction, to verify the target device; and
   when the user and/or user device and target device are authenticated by the verification system processor successfully, causing, by the verification system processor, the restricted information, identified by the set of restricted information identifier data structures in the token received from the user device, to be provided to the target device.

2. The method of claim 1, wherein the seed comprises the session identifier of the session involving the target device and a unique name of an entity associated with the target device and further comprising:
   when the user is authenticated by the verification system processor successfully, providing, by the verification system processor, an approval code to the target device, the approval code comprising the set of restricted information identifier data structures identifying the restricted information identified by the set of restricted information identifier data structures and the unique recipient identifier associated with the target device or the third party system associated with the target device or an electronic session identifier associated with the electronic session, and a transaction identifier associated with the transaction to cause an information provider to authorize provision of the restricted information to the user.

3. The method of claim 1, wherein the user identifier comprises information a user device identifier of the user device, the user device identifier comprising one or more of a central processing unit identifier, an IMEI number of the user device, a SIM identifier, a network identifier, an application identifier, and a synchronized counter, a unique trait of the user, the unique trait comprising one or more of a fingerprint, facial attribute, voiceprint, and retina scan, and a current location of the user and/or user device a continuity of location of the user, wherein the seed comprises a plurality of the electronic address or physical location associated with the target device, the unique recipient identifier of the target device, the session identifier of a session involving the target device, and a unique name of an entity associated with the target device, and the random number identifier, and further comprising:
   sending, by the verification system processor and to an information provider, a surrogate identifier associated with the user identifier rather than the user identifier itself, the surrogate identifier being generated by a random or pseudo-random number generator or a cryptographic hash algorithm.

4. The method of claim 1, further comprising:
updating, by the verification system processor, a first distributed, encrypted ledger to comprise details of the electronic session and transaction, the details relating to one or more of each credential issued, each credential authorized by the user, each credential approved by the user, and each transfer of restricted information; and
verifying the details in the first distributed, encrypted ledger with details of a second distributed, encrypted ledger maintained by an information provider to verify the transaction, wherein the transaction is one or more of interrupted, delayed or reversed in an event that there is a difference in the details between the first and a second distributed, encrypted ledgers.

5. The method of claim 1, wherein the restricted information comprises one or more of license permission to execute or access software or media content licensed to the user or user device, a user credential, cryptosystem secret, cryptographic secret, a cryptosystem identifier, and financial-related information, wherein the set of restricted information identifier data structures identifies a type, level, and/or amount of restricted information that the target device is authorized or privileged to receive from an information provider, and wherein a first target device is authorized to receive a first type, level, and/or amount of restricted information at a request of the user while a second target device is authorized to receive a second type, level, and/or amount of information at a request of the user.

6. A verification system, comprising:
a microprocessor; and
a computer-readable memory coupled to the microprocessor, the computer-readable memory comprising a set of instructions that, when executed by a microprocessor, causes the microprocessor to:
generate a token comprising a set of recipient data structures and a set of restricted information identifier data structures, the set of recipient data structures comprising a unique recipient identifier of a target device receiving restricted information and the set of restricted information identifier data structures identifying the restricted information to be provided to the target device, wherein the unique recipient identifier of the target device comprises a random or pseudo-random sequence of numbers or symbols generated by the microprocessor using a random or pseudo-random number generator and a seed, the seed comprising one or more of an electronic address or physical location associated with the target device, the unique recipient identifier of the target device, a session identifier of a session involving the target device, and a random number identifier;
provide the token to the target device;
receive, from a user device associated with a user and as part of an electronic session and transaction, a user identifier and the token, wherein the token comprises the unique recipient identifier of the target device;
authenticate the user identifier, as part of the transaction, to verify the user and/or user device;
authenticate the unique recipient identifier comprised in the token received from the user device, as part of the transaction, to verify the target device; and
when the user and/or user device and target device are authenticated by the verification system successfully, cause the restricted information, identified by the set of restricted information identifier data structures in the token received from the user device, to be provided to the target device.

7. The verification system of claim 6, wherein the seed comprises the session identifier of the session involving the target device and a unique name of an entity associated with the target device and wherein the microprocessor further:
when the user is authenticated by the verification system successfully, provides an approval code to the target device, the approval code comprising a restricted information identifier of the restricted information and the unique recipient identifier associated with the target device or a third party system associated with the target device or an electronic session identifier associated with the electronic session, and a transaction identifier associated with the transaction to cause an information provider to authorize provision of the restricted information to the user.

8. The verification system of claim 6, wherein the user identifier comprises information a user device identifier of the user device, the user device identifier comprising one or more of a central processing unit identifier, an IMEI number of the user device, a SIM identifier, a network identifier, an application identifier, and a synchronized counter, a unique trait of the user, the unique trait comprising one or more of a fingerprint, facial attribute, voiceprint, and retina scan, and a current location of the user and/or user device a continuity of location of the user, wherein the seed comprises a plurality of the electronic address or physical location associated with the target device, the unique recipient identifier of the target device, the session identifier of the session involving the target device, and a unique name of an entity associated with the target device, and the random number identifier, and wherein the microprocessor further:
sends to an information provider, a surrogate identifier associated with the user identifier rather than the user identifier itself, the surrogate identifier being generated by a random or pseudo-random number generator or a cryptographic hash algorithm.

9. The verification system of claim 6, wherein the microprocessor further:
updates a first distributed, encrypted ledger to comprise details of the electronic session and transaction, the details relating to one or more of each credential issued, each credential authorized by the user, each credential approved by the user, and each transfer of restricted information; and
verifies the details in the first distributed, encrypted ledger with details of a second distributed, encrypted ledger maintained by an information provider to verify the transaction, wherein the transaction is one or more of interrupted, delayed or reversed in an event that there is a difference in the details between the first and a second distributed, encrypted ledgers.

10. The verification system of claim 6, wherein the restricted information comprises one or more of license permission to execute or access software or media content licensed to the user or user device, a user credential, cryptosystem secret, cryptographic secret, a cryptosystem identifier, and financial-related information, wherein the set of restricted information identifier data structures identifies a type, level, and/or amount of restricted information that the target device is authorized or privileged to receive from an information provider, and wherein a first target device is authorized to receive a first type, level, and/or amount of restricted information at a request of the user while a second target device is authorized to receive a second type, level, and/or amount of information at a request of the user.

11. A non-transitory computer readable storage medium comprising:

one or more sets of instructions that, when executed by a microprocessor:
  generates a token comprising a set of recipient data structures and a set of restricted information identifier data structures, the set of recipient data structures comprising a unique recipient identifier of a target device receiving restricted information and the set of restricted information identifier data structures identifying the restricted information to be provided to the target device, wherein the unique recipient identifier of the target device comprises a random or pseudo-random sequence of numbers or symbols generated by the microprocessor using a random or pseudo-random number generator and a seed, the seed comprising one or more of an electronic address or physical location associated with a target device, the unique recipient identifier of the target device, a session identifier of a session involving the target device, and a random number identifier;
  provides the token to a third party system associated with the target device;
  receives, from a user device associated with a user and as part of an electronic session and transaction, a user identifier and the token, wherein the token comprises the unique recipient identifier of the target device;
  authenticates the user identifier, as part of the transaction, to verify the user and/or user device;
  authenticates the unique recipient identifier comprised in the token received from the user device, as part of the transaction, to verify the target device; and
  when the user and/or user device and target device are authenticated by the microprocessor successfully, causes the restricted information, identified by the set of restricted information identifier data structures in the token received from the user device, to be provided to the target device.

12. The non-transitory computer readable storage medium of claim 11, wherein the seed comprises the session identifier of the session involving the target device and a unique name of an entity associated with the target device and wherein the one or more sets of instructions, when executed by the microprocessor, further:
  when the user is authenticated by the microprocessor successfully, provides an approval code to the target device, the approval code comprising a restricted information identifier of the restricted information and the unique recipient identifier associated with the target device or a third party system associated with the target device or an electronic session identifier associated with the electronic session, and a transaction identifier associated with the transaction to cause an information provider to authorize provision of the restricted information to the user.

13. The non-transitory computer readable storage medium of claim 11, wherein the user identifier comprises information a user device identifier of the user device, the user device identifier comprising one or more of a central processing unit identifier, an IMEI number of the user device, a SIM identifier, a network identifier, an application identifier, and a synchronized counter, a unique trait of the user, the unique trait comprising one or more of a fingerprint, facial attribute, voiceprint, and retina scan, and a current location of the user and/or user device a continuity of location of the user, wherein the seed comprises a plurality of the electronic address or physical location associated with the target device, the unique recipient identifier of the target device, the session identifier of the session involving the target device, and a unique name of an entity associated with the target device, and the random number identifier, and wherein the one or more sets of instructions, when executed by the microprocessor, further:
  sends to an information provider, a surrogate identifier associated with the user identifier rather than the user identifier itself, the surrogate identifier being generated by a random or pseudo-random number generator or a cryptographic hash algorithm.

14. The non-transitory computer readable storage medium of claim 11, wherein the one or more sets of instructions, when executed by the microprocessor, further:
  updates a first distributed, encrypted ledger to comprise details of the electronic session and transaction, the details relating to one or more of each credential issued, each credential authorized by the user, each credential approved by the user, and each transfer of restricted information; and
  verifies the details in the first distributed, encrypted ledger with details of a second distributed, encrypted ledger maintained by an information provider to verify the transaction, wherein the transaction is one or more of interrupted, delayed or reversed in an event that there is a difference in the details between the first and a second distributed, encrypted ledgers.

15. The non-transitory computer readable storage medium of claim 11, wherein the restricted information comprises one or more of license permission to execute or access software or media content licensed to the user or user device, a user credential, cryptosystem secret, cryptographic secret, a cryptosystem identifier, and financial-related information, wherein the set of restricted information identifier data structures identifies a type, level, and/or amount of restricted information that the target device is authorized or privileged to receive from an information provider, and wherein a first target device is authorized to receive a first type, level, and/or amount of restricted information at a request of the user while a second target device is authorized to receive a second type, level, and/or amount of information at a request of the user.

16. The method of claim 1, wherein the target device is associated with a merchant, wherein the token comprises a set of product or service identifier data structures comprising a product or service identifier of an associated product or service, wherein the token is embedded in an internet advertisement selected by the user device, wherein the verification system processor receives an identifier associated with the internet advertisement; and wherein the restricted information relates to payment for the associated product or service.

17. The verification system of claim 6, wherein the target device is associated with a merchant, wherein the token comprises a set of product or service identifier data structures comprising a product or service identifier of an associated product or service, wherein the token is embedded in an internet advertisement selected by the user device, wherein the microprocessor receives an identifier associated with the internet advertisement; and
  wherein the restricted information relates to payment for the associated product or service.

18. The non-transitory computer readable storage medium of claim 11, wherein the target device is associated with a merchant, wherein the token comprises a set of product or service identifier data structures comprising a product or service identifier of an associated product or service, wherein the token is embedded in an internet advertisement selected by the user device, wherein the microprocessor receives an identifier associated with the internet advertisement; and wherein the restricted information relates to payment for the associated product or service.

\* \* \* \* \*